US012621025B2

(12) United States Patent
Noh et al.

(10) Patent No.: US 12,621,025 B2
(45) Date of Patent: May 5, 2026

(54) BEAMFORMING METHOD AND DEVICE IN WIRELESS COMMUNICATION SYSTEM

(71) Applicants: LG ELECTRONICS INC., Seoul (KR); KOREA ADVANCED INSTITUTE OF SCIENCE AND TECHNOLOGY, Daejeon (KR)

(72) Inventors: Sangmi Noh, Daejeon (KR); Jaehoon Chung, Seoul (KR); Sangrim Lee, Seoul (KR); Seongjae Kim, Daejeon (KR); Dangoh Kim, Sejong (KR); Seungwon Keum, Daejeon (KR); Juyong Lee, Daejeon (KR); Dongho Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 490 days.

(21) Appl. No.: 18/013,865

(22) PCT Filed: Jul. 9, 2020

(86) PCT No.: PCT/KR2020/009057
§ 371 (c)(1),
(2) Date: Dec. 29, 2022

(87) PCT Pub. No.: WO2022/010012
PCT Pub. Date: Jan. 13, 2022

(65) Prior Publication Data
US 2023/0299825 A1 Sep. 21, 2023

(51) Int. Cl.
*H04B 7/06* (2006.01)
*H01Q 3/40* (2006.01)

(52) U.S. Cl.
CPC ............. *H04B 7/0617* (2013.01); *H01Q 3/40* (2013.01)

(58) Field of Classification Search
CPC ...... H04B 7/0617; H01Q 3/40; H01Q 21/065; H01Q 3/24; H01Q 3/30; H01Q 9/0442; H01Q 9/045; H01Q 21/061; H01Q 21/24
See application file for complete search history.

(56) References Cited

U.S. PATENT DOCUMENTS

2014/0049440 A1 2/2014 Ueki et al.
2016/0308597 A1* 10/2016 Kim ..................... H04B 7/0671
(Continued)

FOREIGN PATENT DOCUMENTS

JP     2011-055428 A    3/2011
KR     10-1894240 B1    9/2018
KR     10-1917044 B1    11/2018

*Primary Examiner* — Vladimir Magloire
*Assistant Examiner* — Naomi M Wolford
(74) *Attorney, Agent, or Firm* — BRYAN CAVE LEIGHTON

(57) ABSTRACT

According to an embodiment of the present disclosure, a beamforming method performed by a wireless device having an array antenna in a wireless communication system comprises the steps of: calculating a phase related to a target beamforming direction; determining antenna patterns related to the target beamforming direction from among antenna patterns preconfigured in relation to beamforming; and applying, to the array antenna, an antenna pattern based on the phase from among the antenna patterns related to the target beamforming direction. Each antenna included in the array antenna includes multiple feeding points and a variable reactance element connected to at least one feeding point among the multiple feeding points. The antenna pattern is related to at least one of i) a selection of at least one feeding point among the multiple feeding points and ii) a reactance value of the variable reactance element.

8 Claims, 48 Drawing Sheets

(56) References Cited

U.S. PATENT DOCUMENTS

| | | | | |
|---|---|---|---|---|
| 2017/0062928 | A1* | 3/2017 | Legare ................. | H01Q 21/065 |
| 2019/0349045 | A1* | 11/2019 | Varatharaajan ...... | H04B 7/0469 |
| 2020/0166623 | A1 | 5/2020 | Sahin et al. | |
| 2020/0335859 | A1* | 10/2020 | Driscoll .............. | H01Q 21/065 |

* cited by examiner

【FIG. 1】
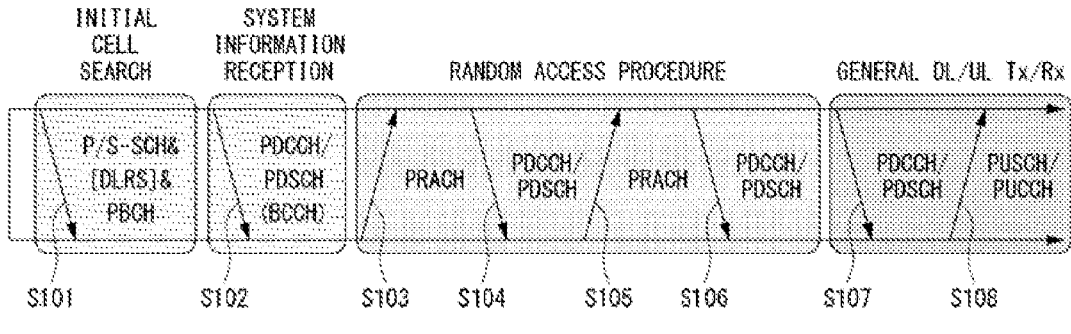
INITIAL CELL SEARCH    SYSTEM INFORMATION RECEPTION    RANDOM ACCESS PROCEDURE    GENERAL DL/UL Tx/Rx
P/S-SCH& [DLRS]& PBCH    PDCCH/ PDSCH (BCCH)    PRACH   PDCCH/ PDSCH   PRACH   PDCCH/ PDSCH   PDCCH/ PDSCH   PUSCH/ PUCCH
S101    S102    S103   S104   S105   S106   S107   S108
- DL/UL ACK/NACK
- UE CQI/PMI/RI REPORT USING PUSCH AND PUCCH 【FIG. 2】
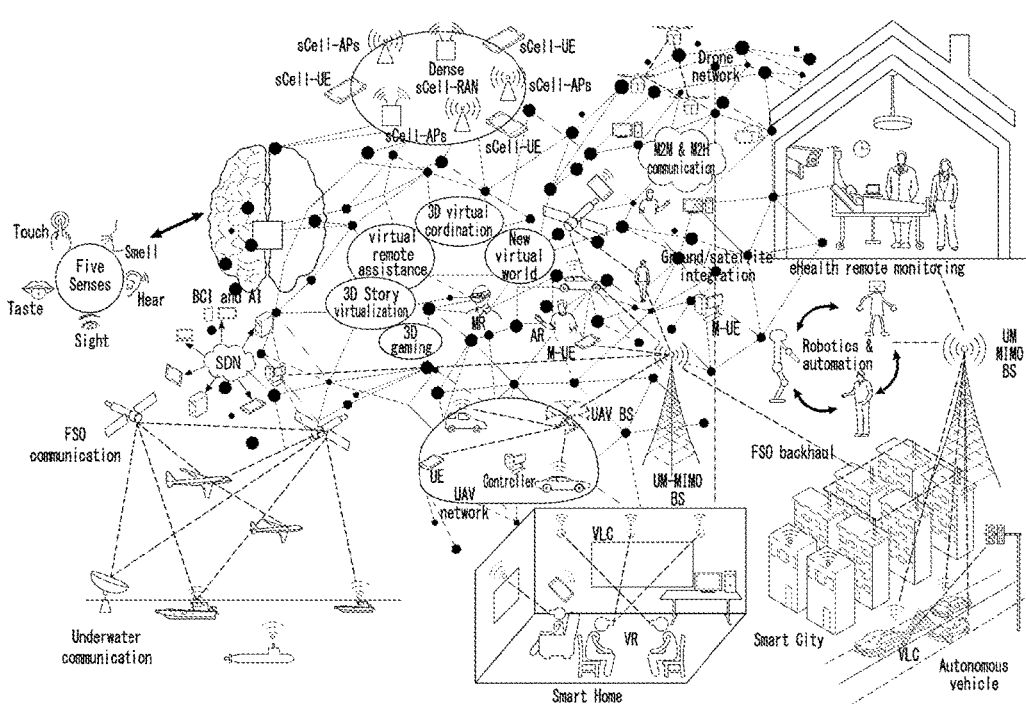

【FIG. 3】
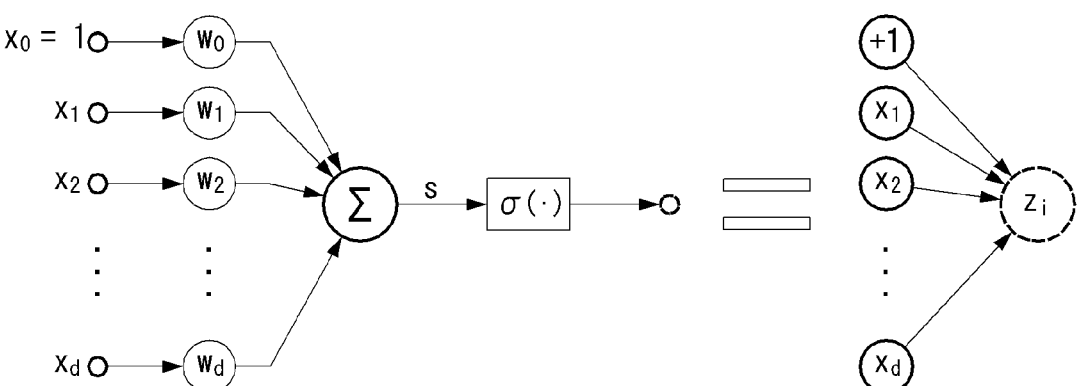

【FIG. 4】
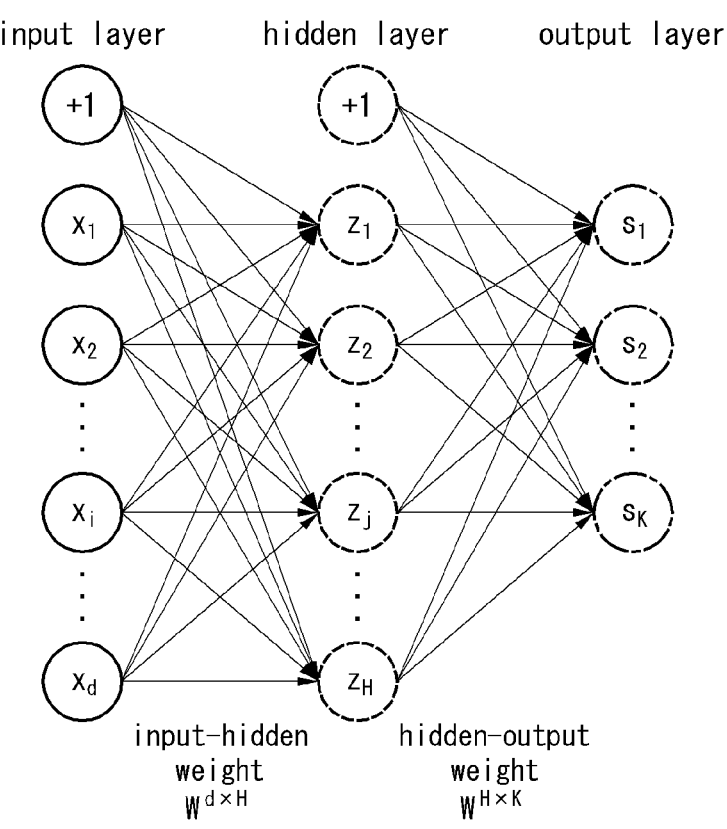

【FIG. 5】
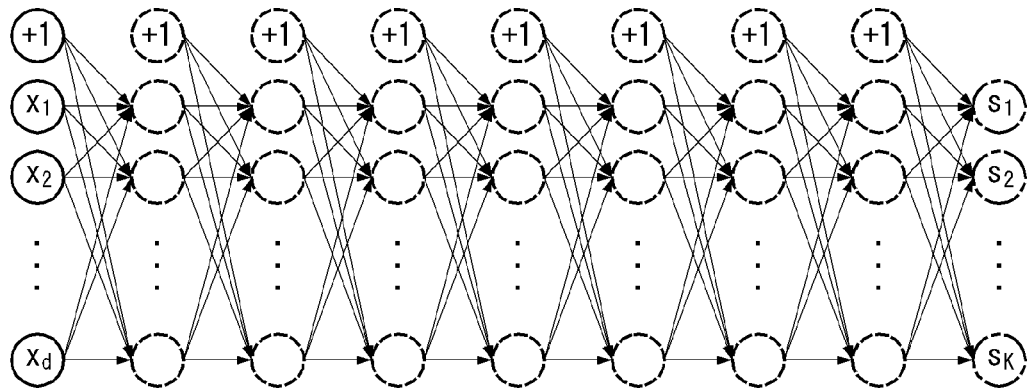

【FIG. 6】
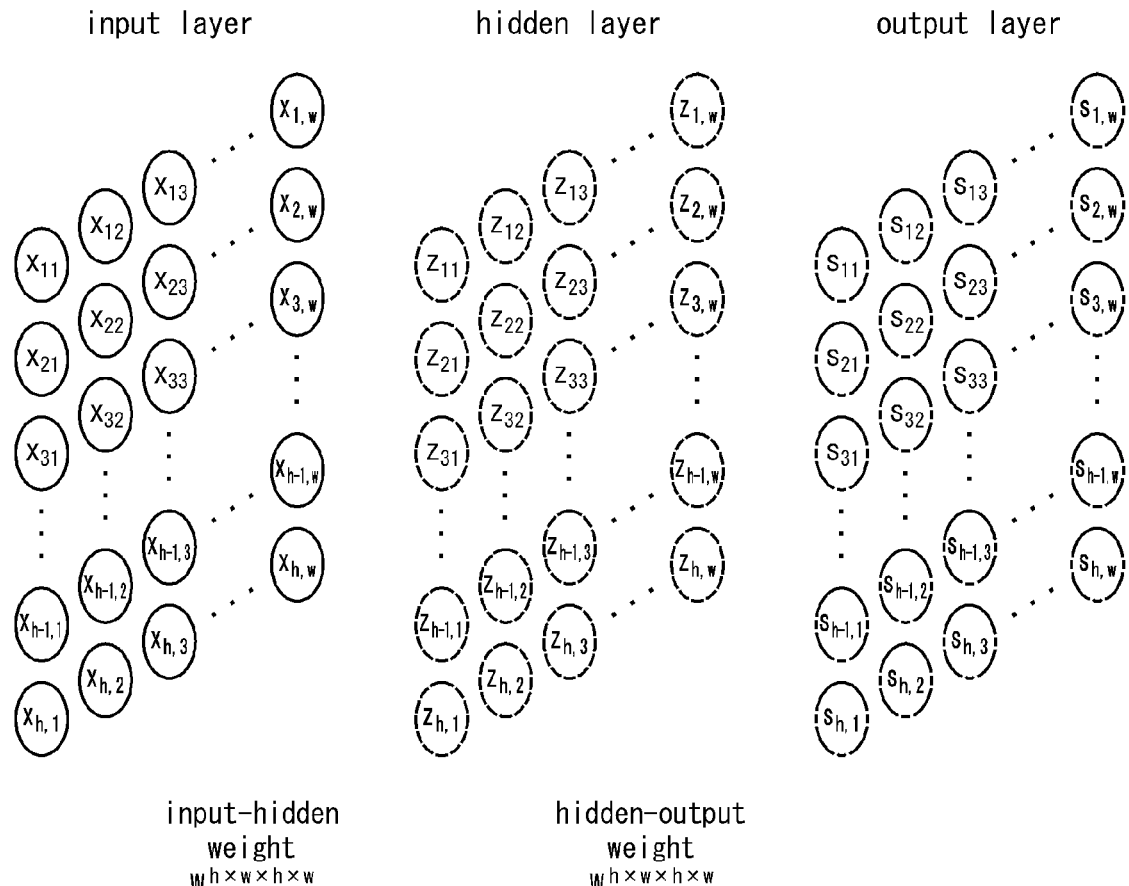

【FIG. 7】
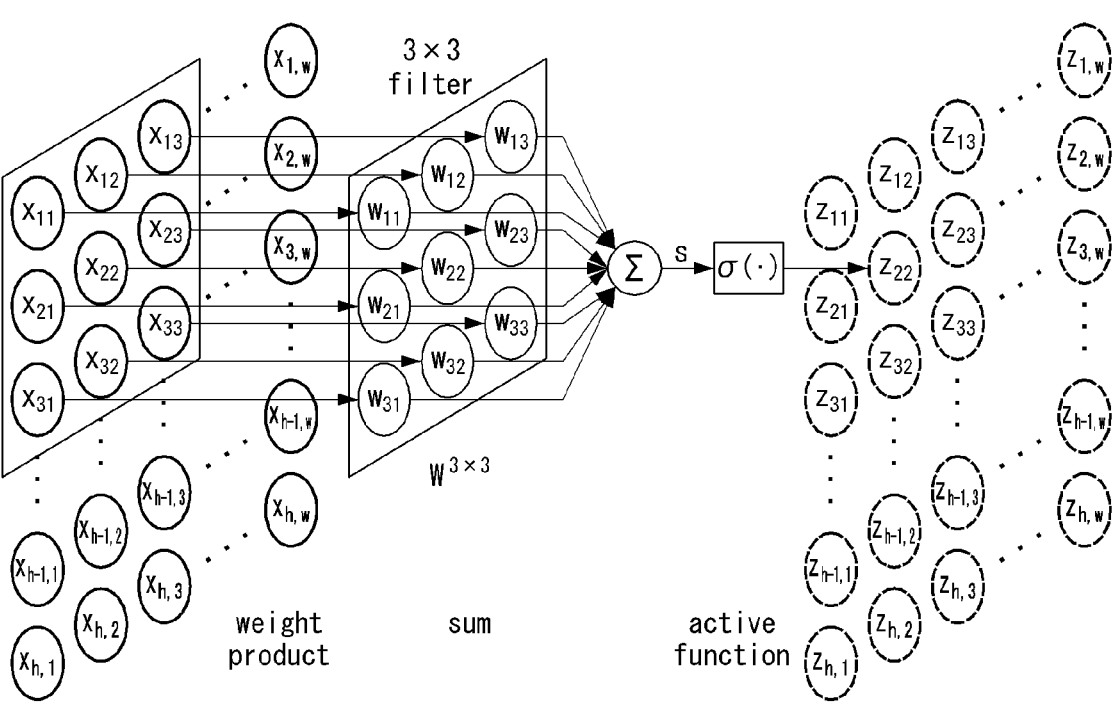

【FIG. 8】
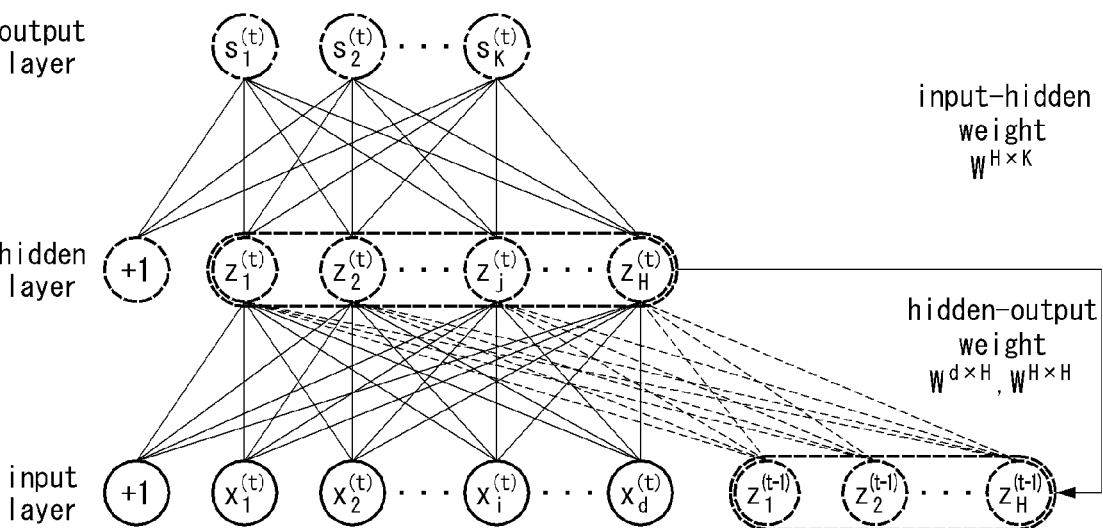

【FIG. 9】
| time | input sequence |
|------|----------------|
| 1 | $(x_1^{(1)}, x_2^{(1)} \cdots , x_d^{(1)})$ |
| 2 | $(x_1^{(2)}, x_2^{(2)} \cdots , x_d^{(2)})$ |
| 3 | $(x_1^{(3)}, x_2^{(3)} \cdots , x_d^{(3)})$ |
| | : |
| t | $(x_1^{(t)}, x_2^{(t)} \cdots , x_d^{(t)})$ |
| | : |
| T | $(x_1^{(T)}, x_2^{(T)} \cdots , x_d^{(T)})$ |
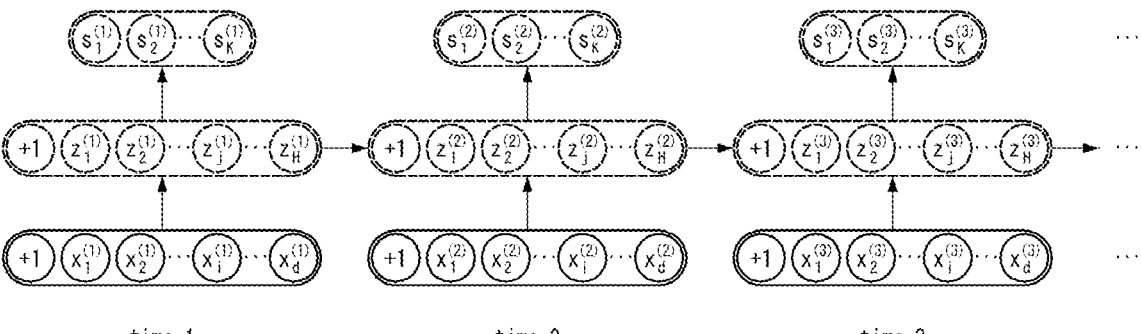

【FIG. 10】
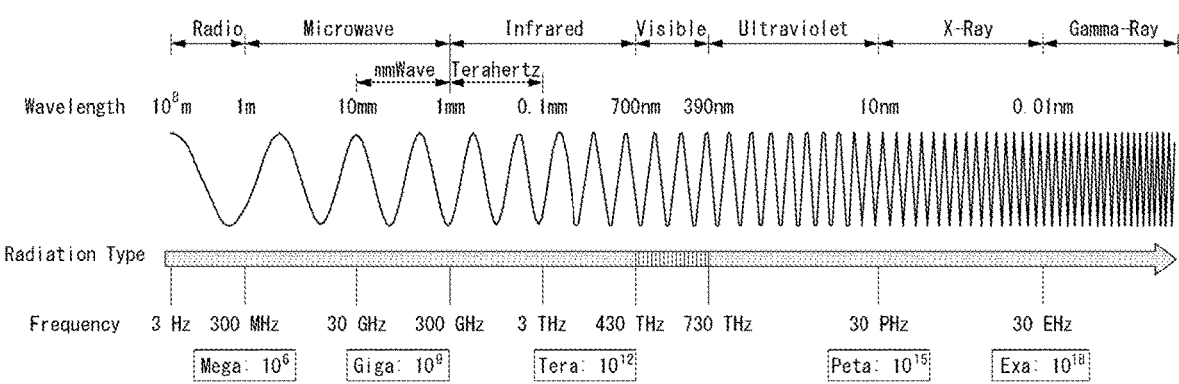

【FIG. 11】
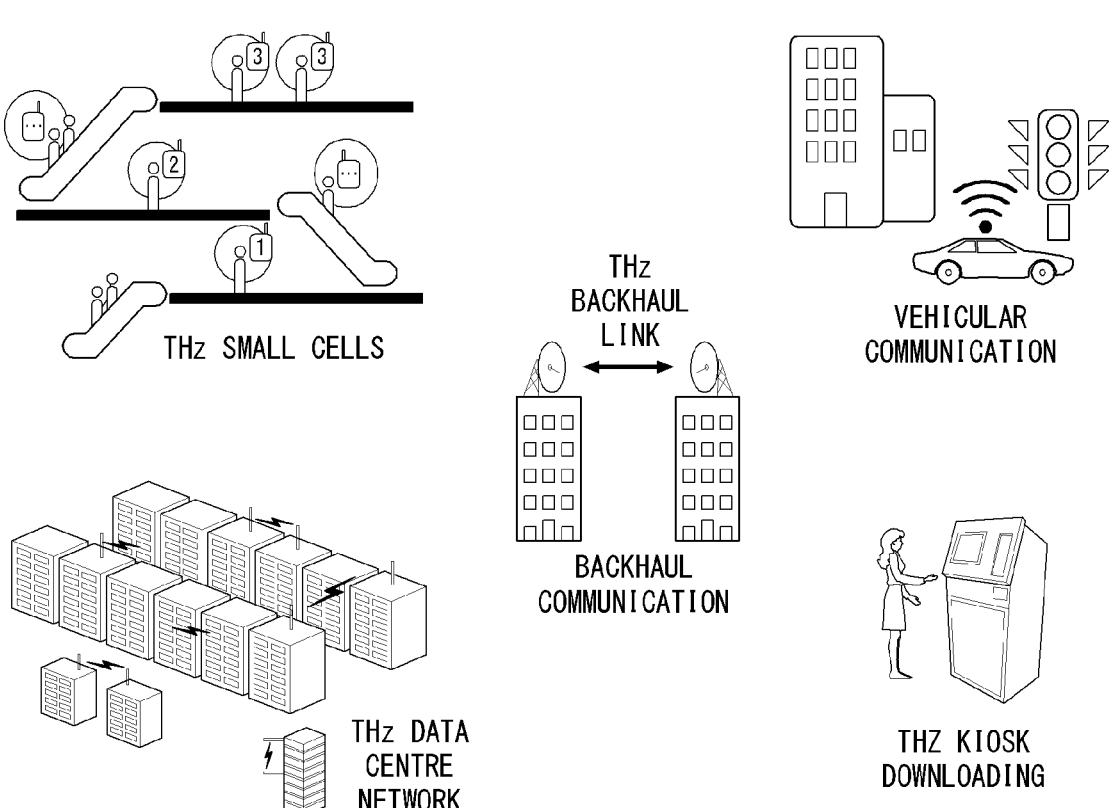
THz SMALL CELLS
THz
BACKHAUL
LINK
BACKHAUL
COMMUNICATION
VEHICULAR
COMMUNICATION
THz DATA
CENTRE
NETWORK
THZ KIOSK
DOWNLOADING 【FIG. 12】
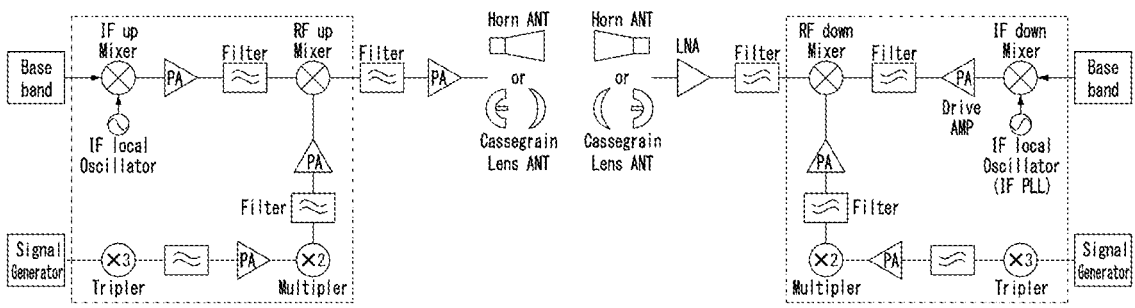
【FIG. 13】
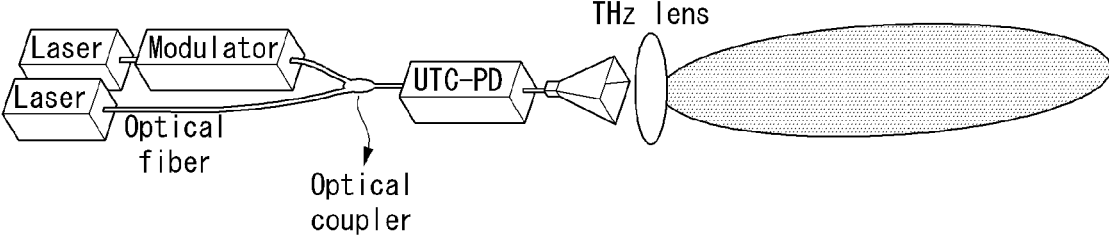

【FIG. 14】
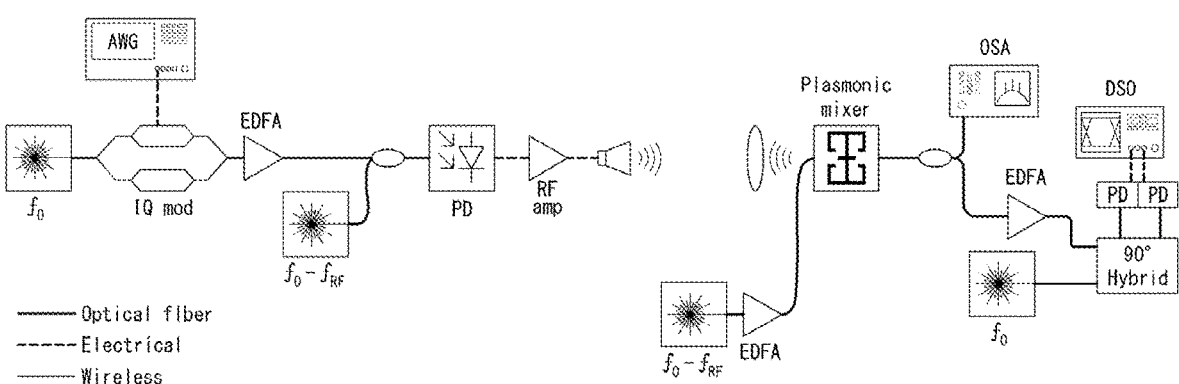

【FIG. 15】
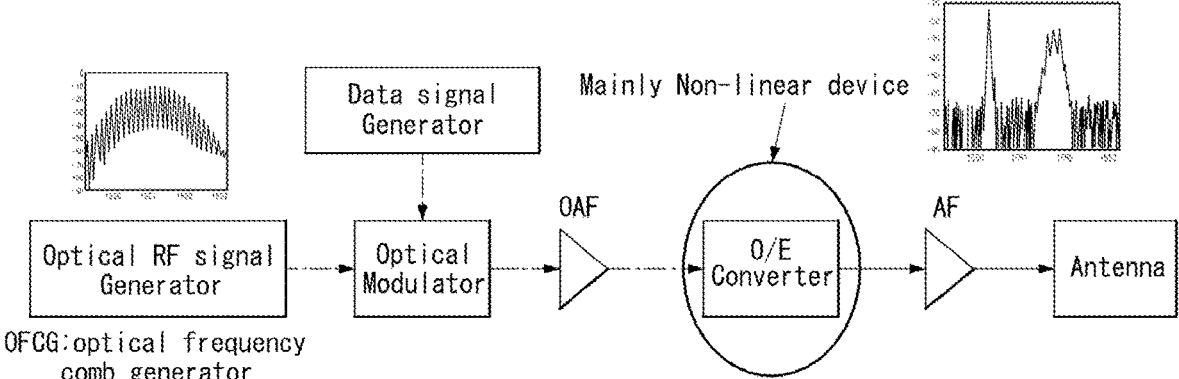

【FIG. 16】
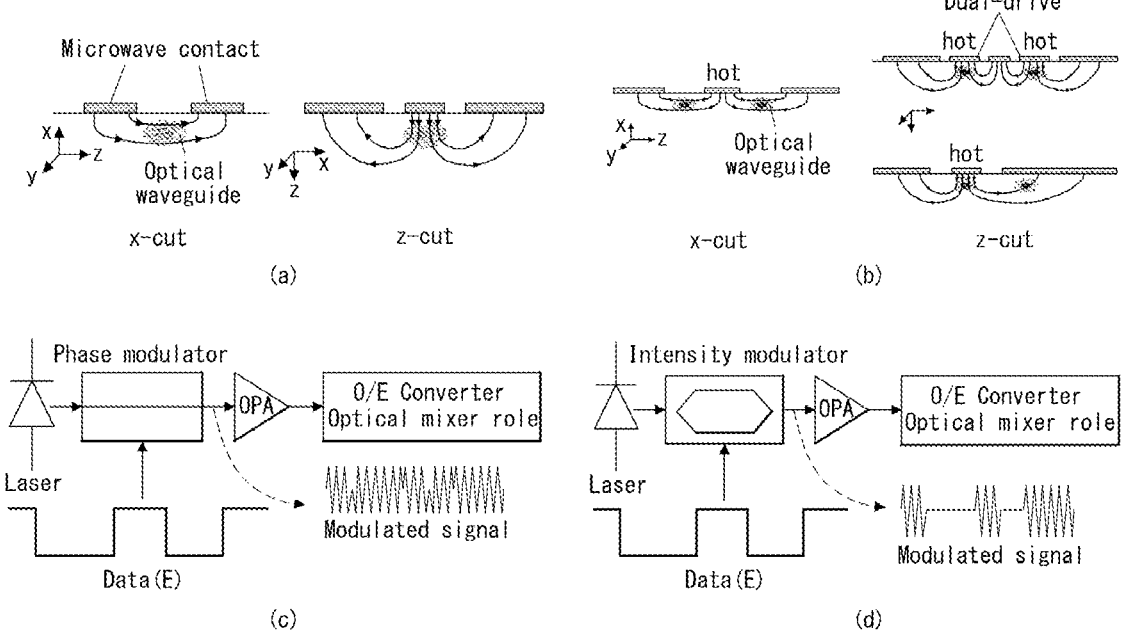

【FIG. 17】
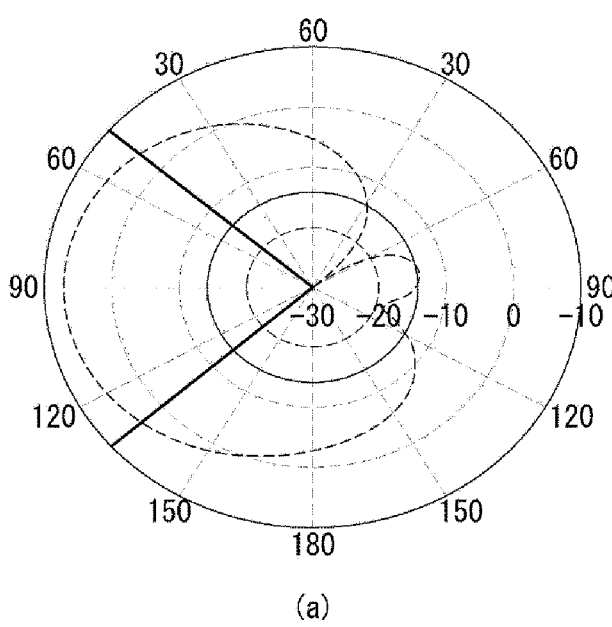
(a)
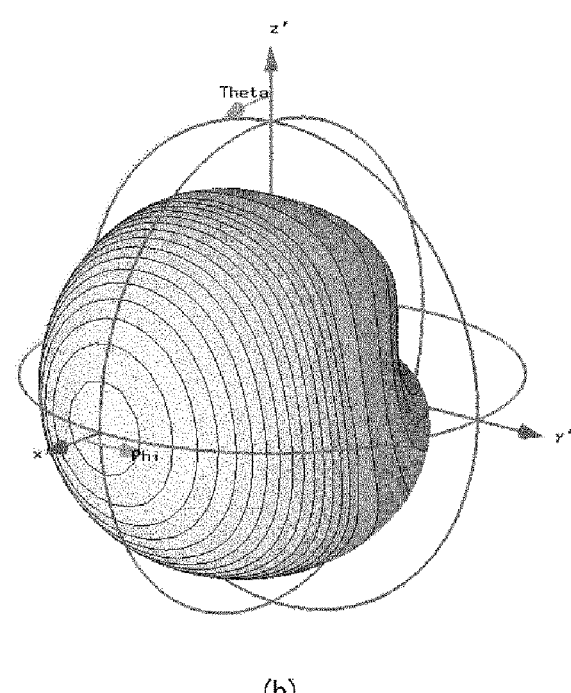
(b)

【FIG. 18】
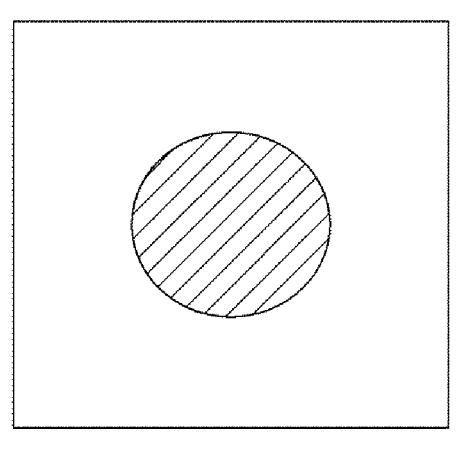
(a)
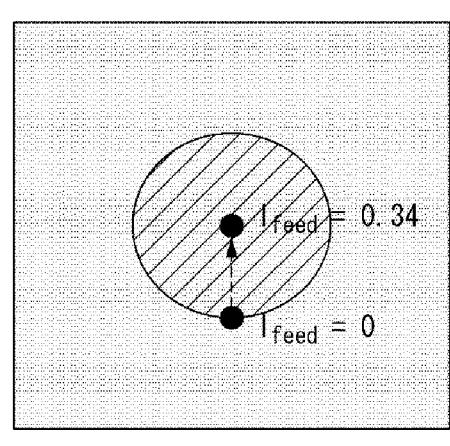
(b)

【FIG. 19】
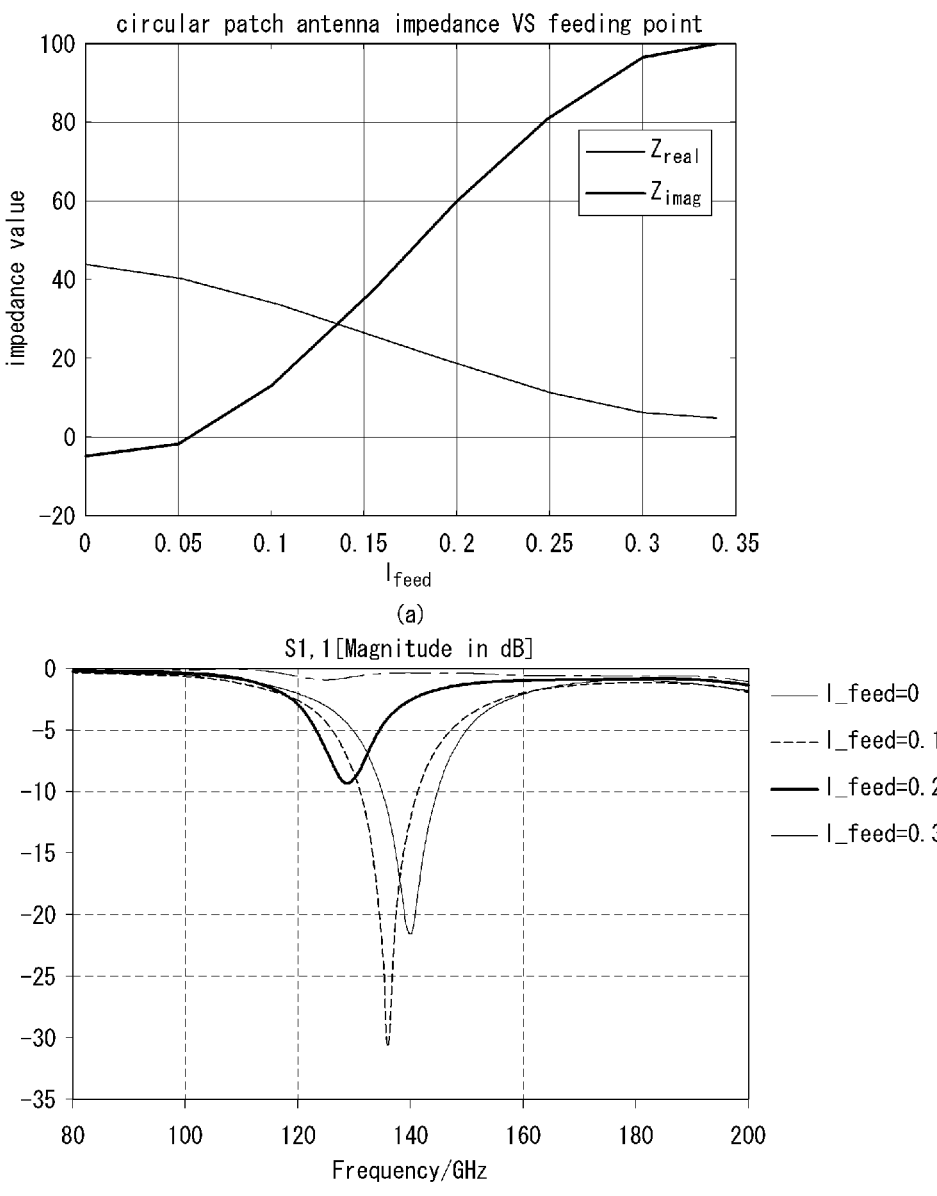
(a)
(b)

【FIG. 20】
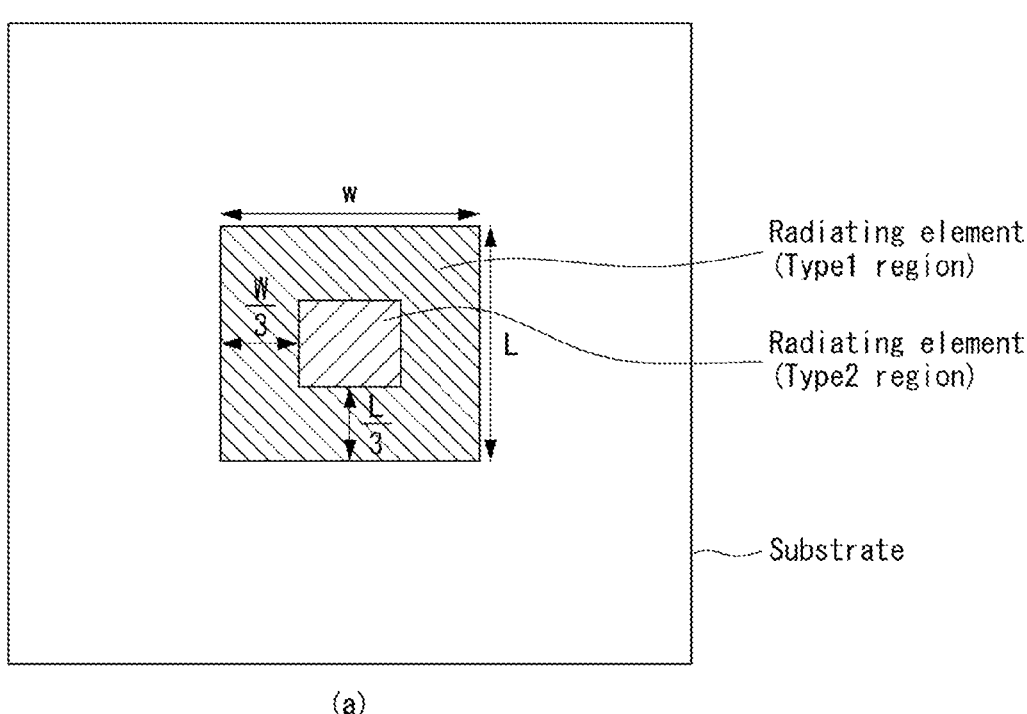
(a)
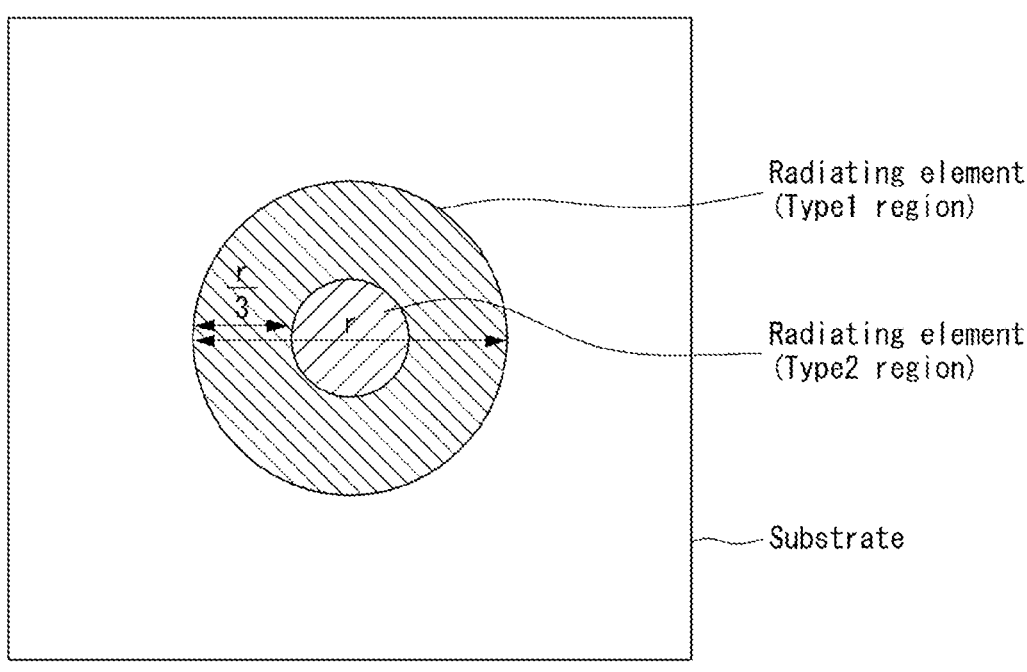
(b)

【FIG. 21】
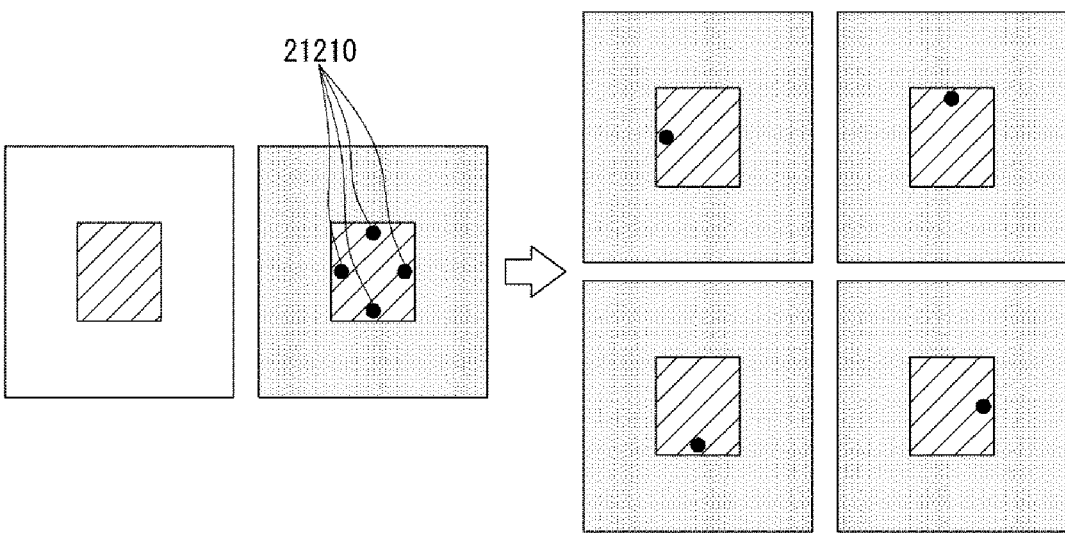

【FIG. 22】
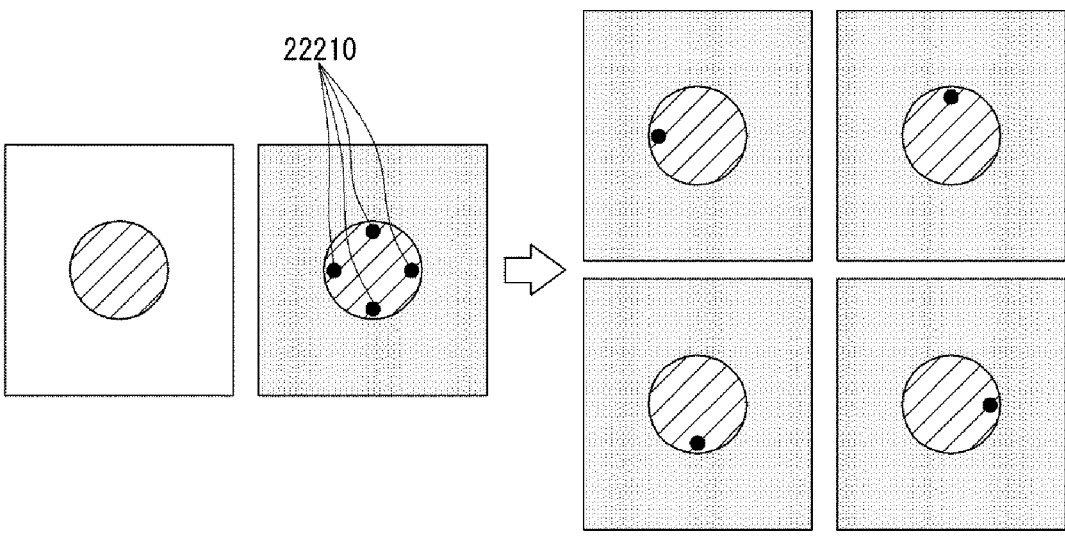

【FIG. 23】
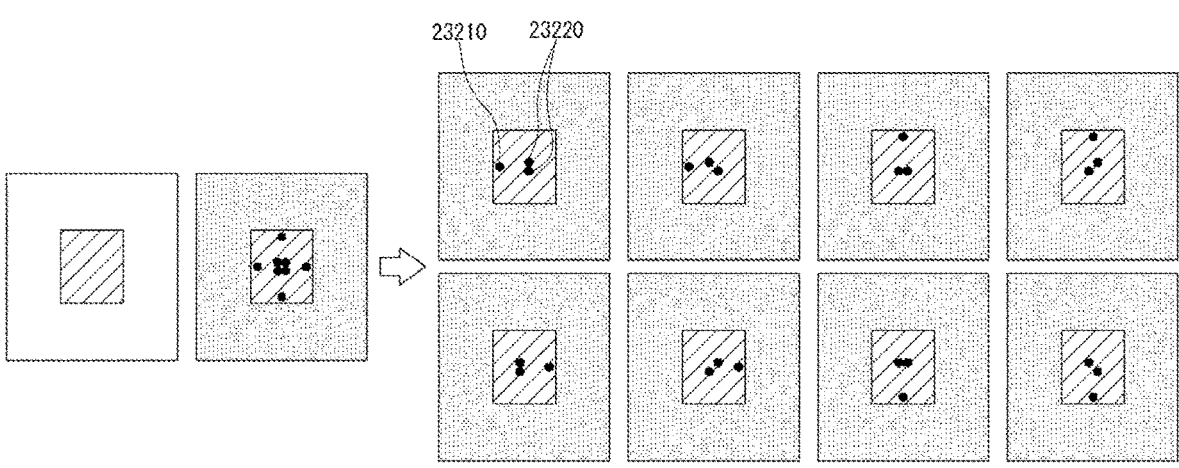

【FIG. 24】
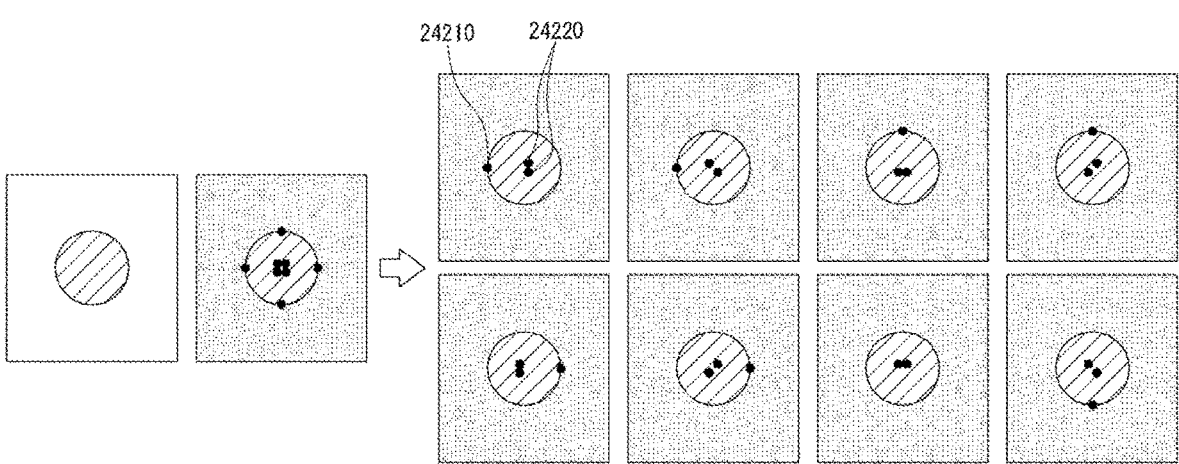

【FIG. 25】
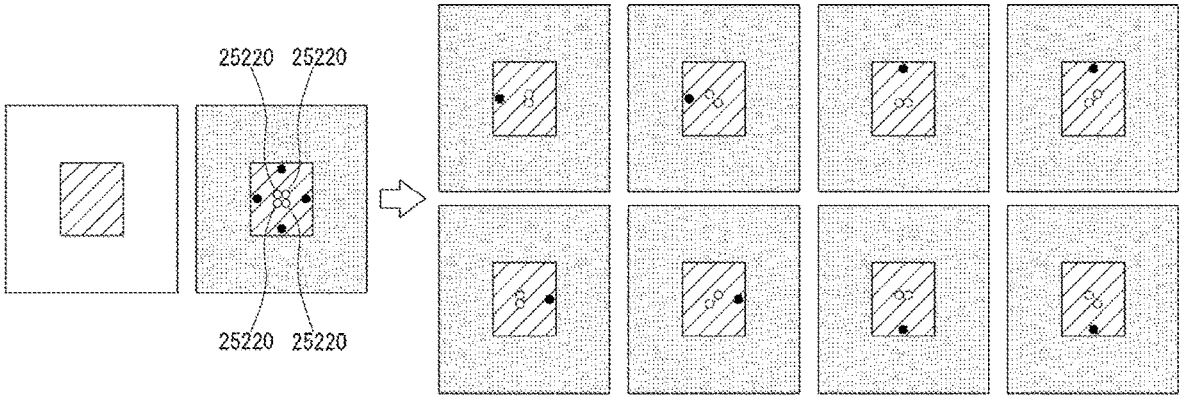

【FIG. 26】
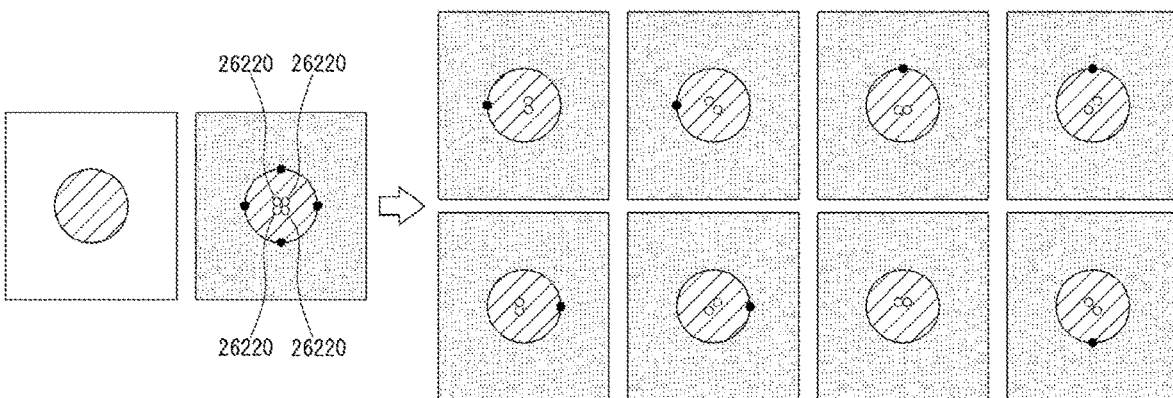

【FIG. 27】
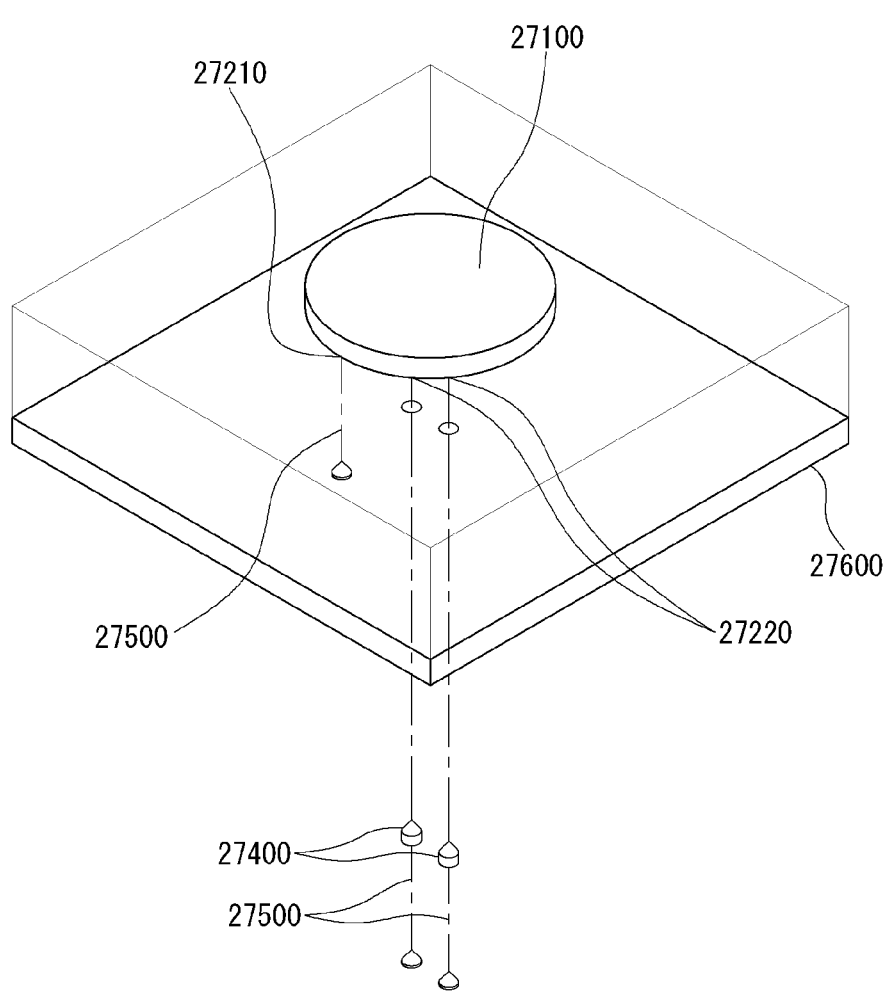

【FIG. 28】
28210  28220
(a)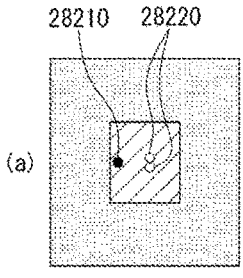
| Variable reactance | X1 | 10 | 100 | 1000 | 100 | 1000 |
| | X2 | 10 | 100 | 1000 | 1 | 1 |
| phase | φ (90° ,0° ) | 41. 95° | 45. 98° | 29. 34° | 40. 67° | 37. 34° |
28220  28210
(b)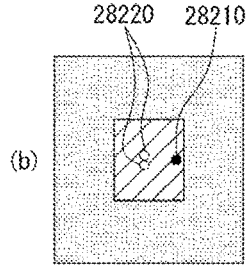
| Variable reactance | X3 | 10 | 100 | 1000 | 1 | 1 |
| | X4 | 10 | 100 | 1000 | 100 | 1000 |
| phase | φ (90° ,0° ) | 220. 42° | 226. 71° | 209. 90° | 220. 66° | 217. 54° |

【FIG. 29】
29210
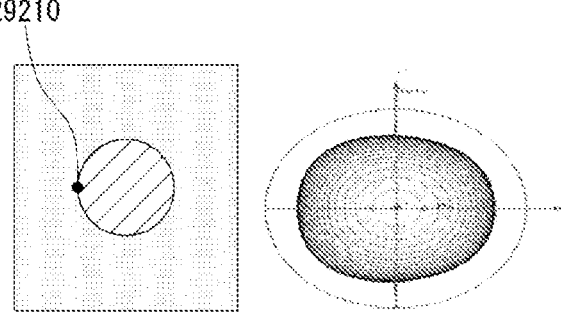
Main lobe direction:(90° ,0° )
$\phi$ (90° ,0° )=23.951°
$\theta$ (90° ,0° )=357.063°
(a)
29210　29220
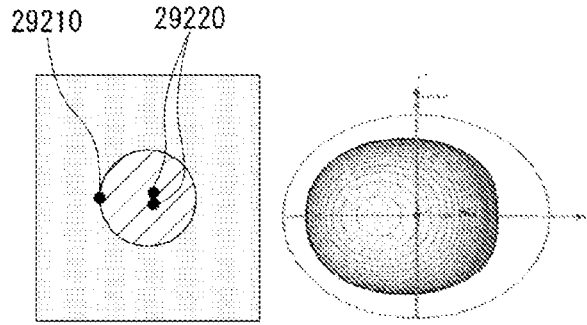
Main lobe direction:(90° ,-16° )
$\phi$ (90° ,0° )=39.284°
$\theta$ (90° ,0° )=317.536°
(b)
29210　29220
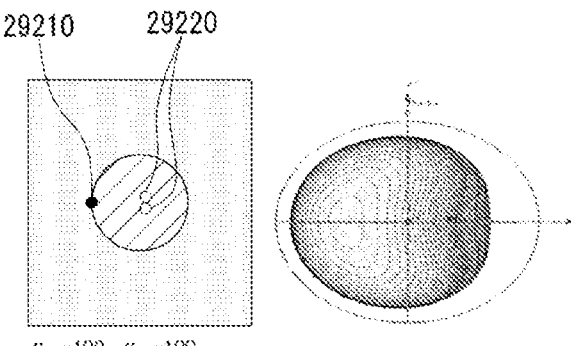
$X_{C1}$=100, $X_{C2}$=100
Main lobe direction:(90° ,-27° )
$\phi$ (90° ,0° )=45.982°
$\theta$ (90° ,0° )=341.022°
(c)

【FIG. 31】
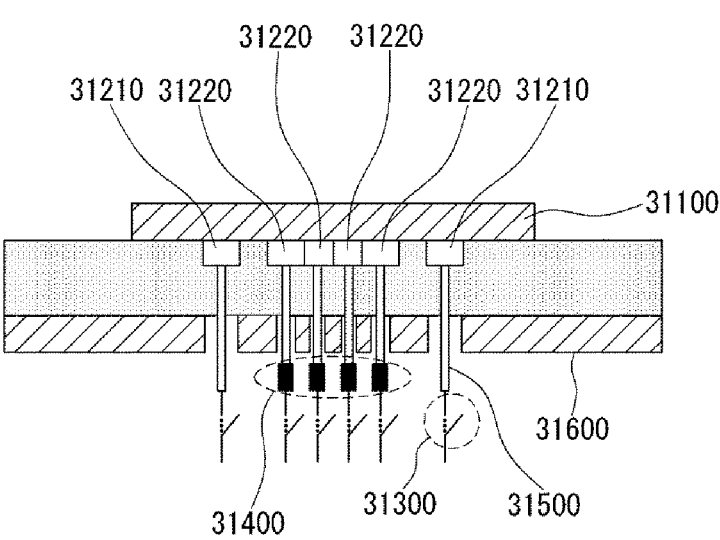

【FIG. 32】
| Target beam direction | Ideal phase shifter value | | | |
|---|---|---|---|---|
| | Ant(1,1) | Ant(1,2) | Ant(1,3) | Ant(1,4) |
| 20° | 0° | 61.6° | 123.1° | 184.7° |
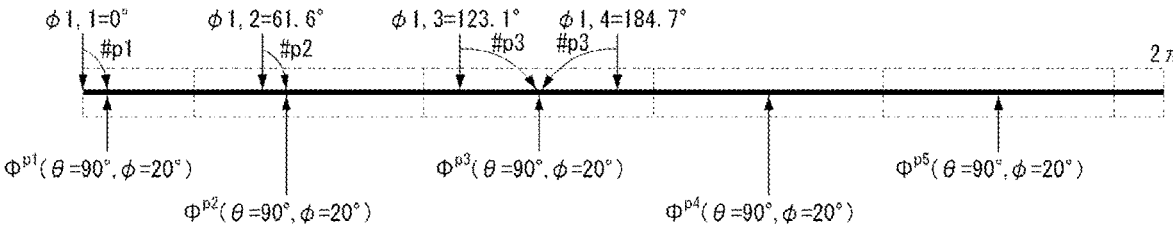

【FIG. 33】
Target beam direction:20°
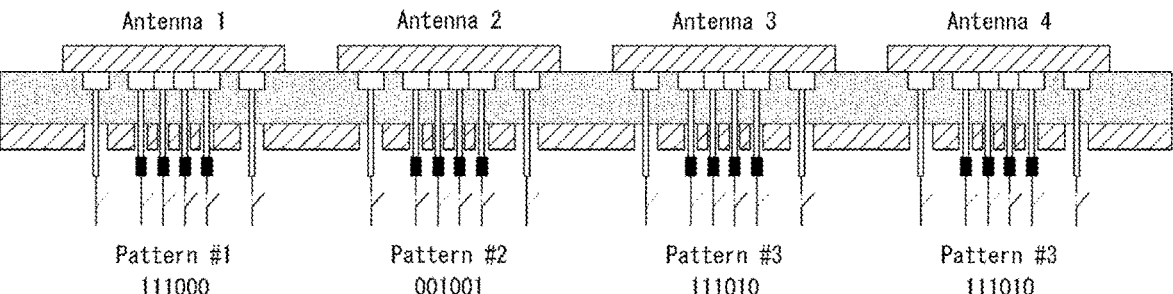
| Antenna 1 | Antenna 2 | Antenna 3 | Antenna 4 |
|---|---|---|---|
| Pattern #1 | Pattern #2 | Pattern #3 | Pattern #3 |
| 111000 | 001001 | 111010 | 111010 |

【FIG. 34】
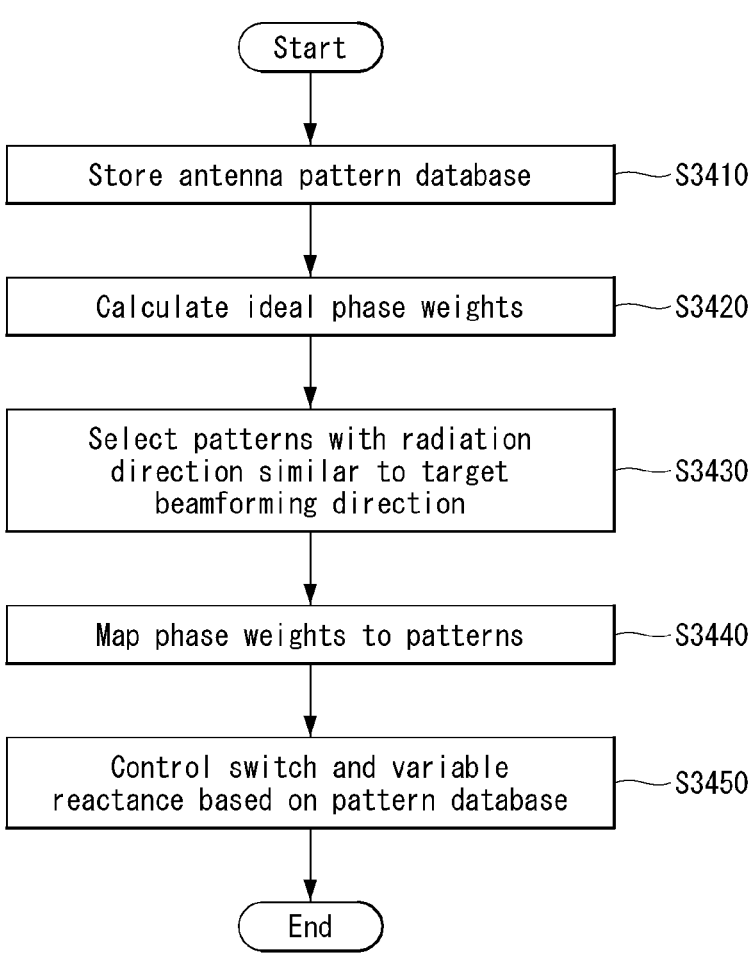

【FIG. 35】
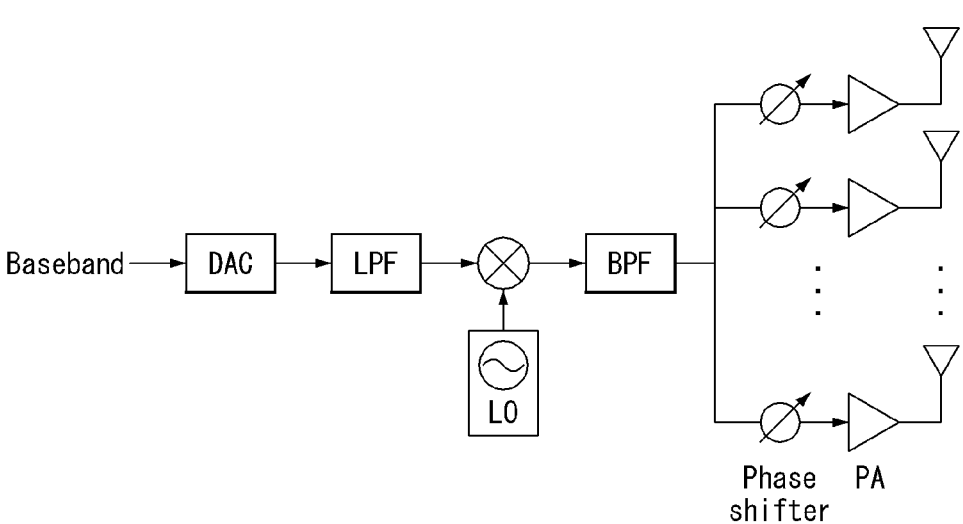

(a)

(b)

【FIG. 37】
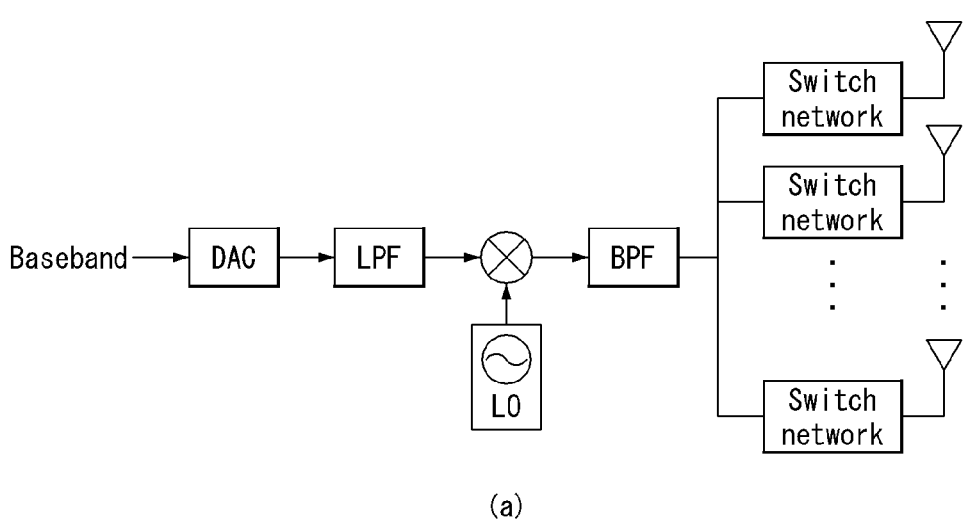
(a)
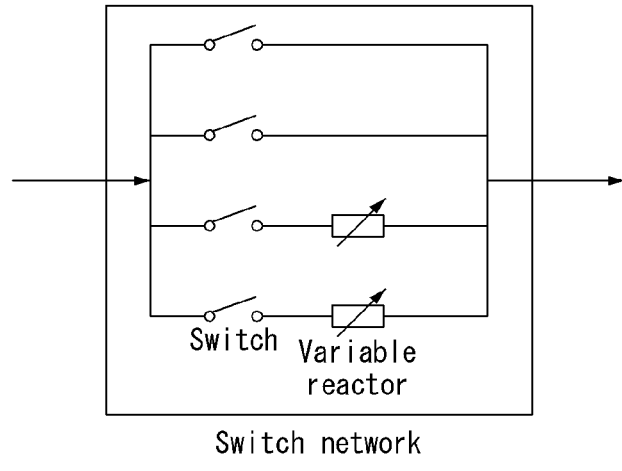
Switch network
(b)

【FIG. 38a】
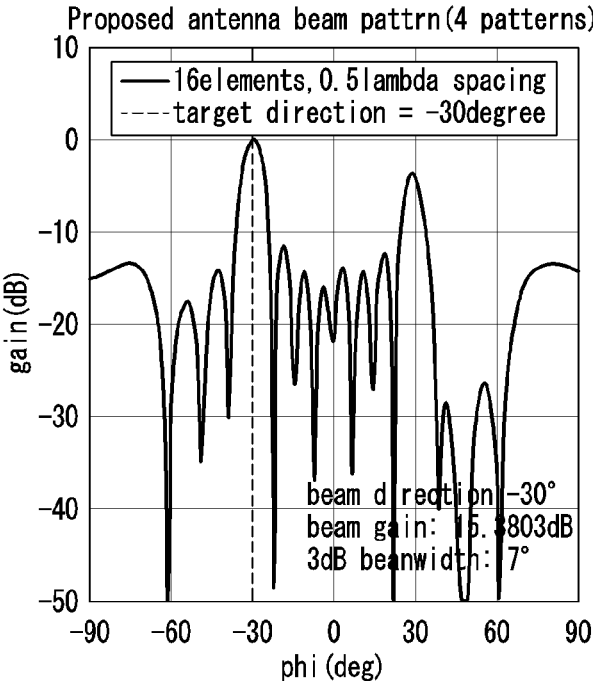
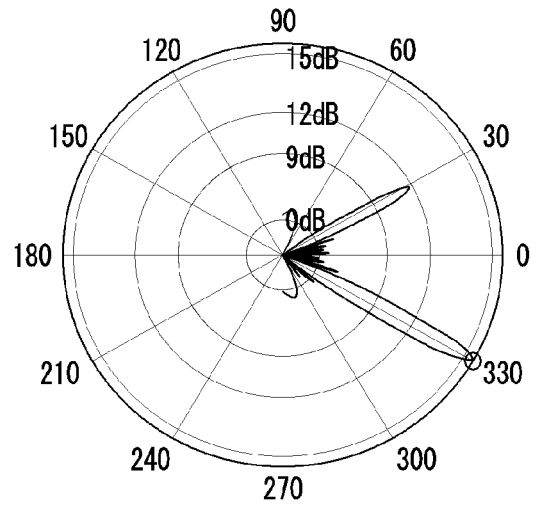

【FIG. 38b】
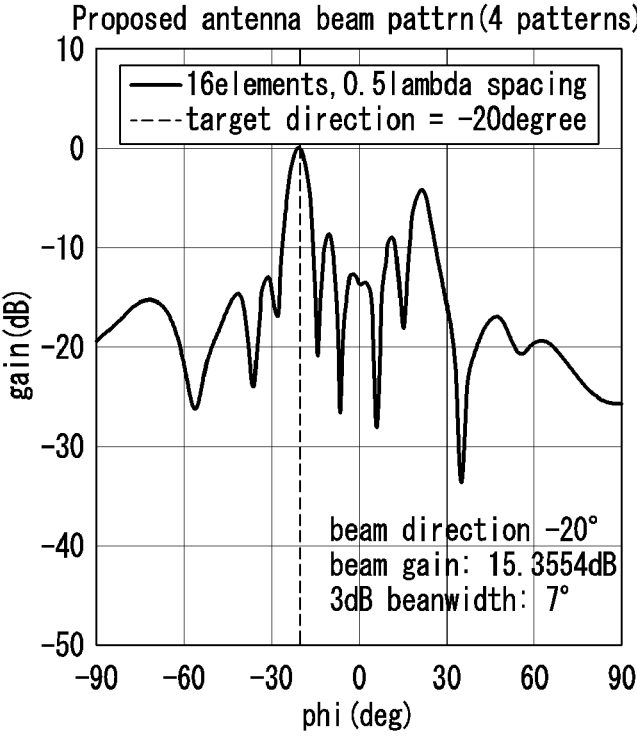
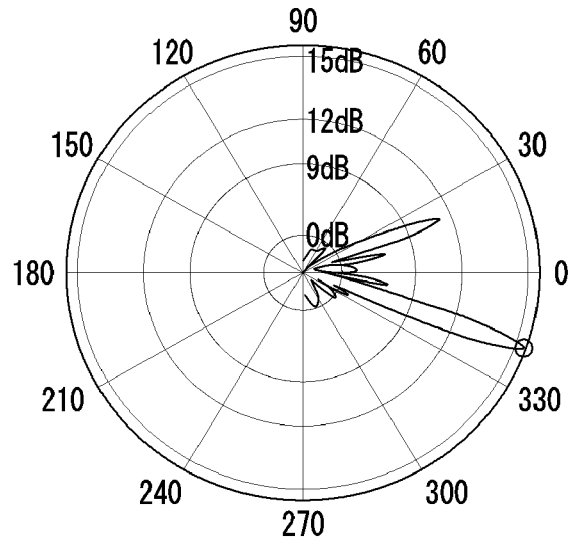

【FIG. 38c】
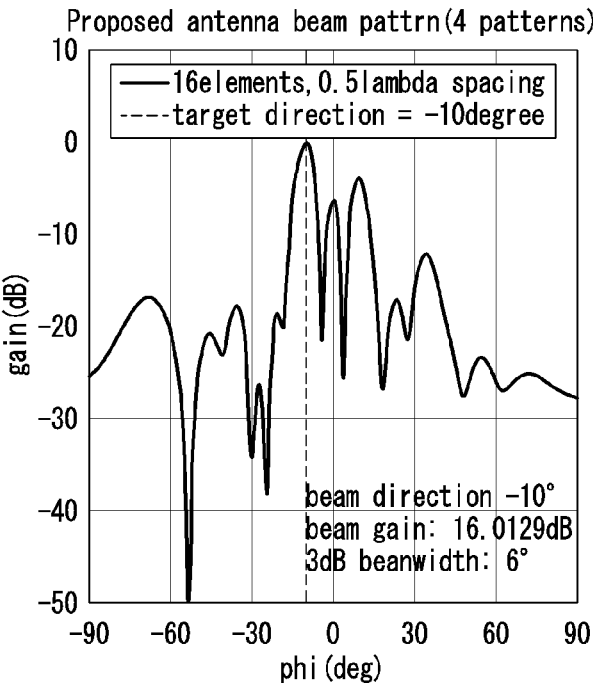
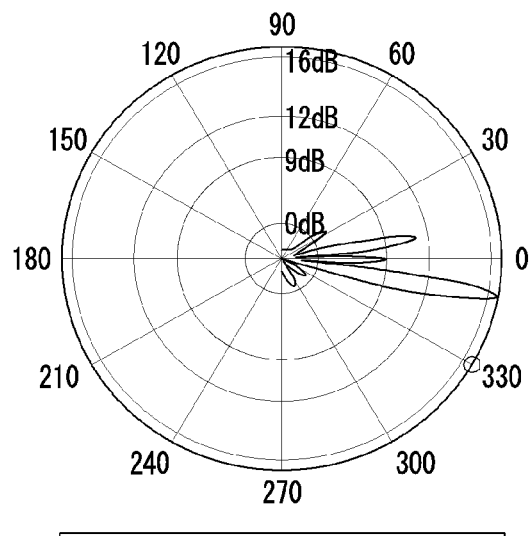

【FIG. 39a】
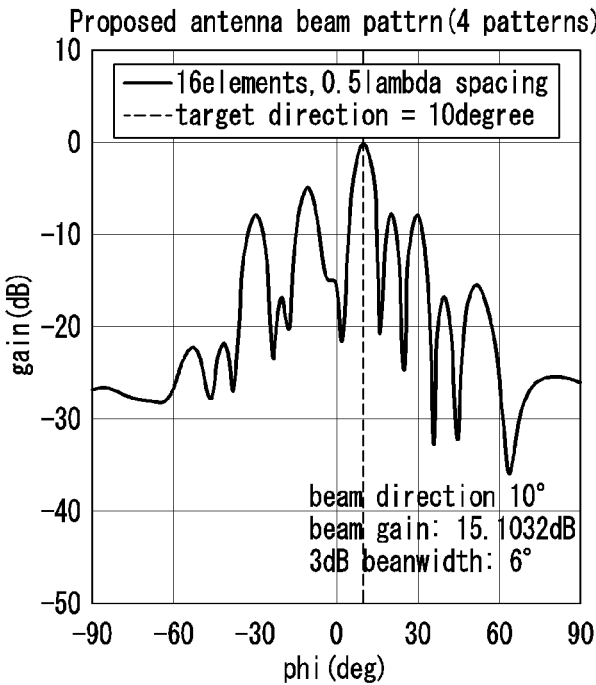
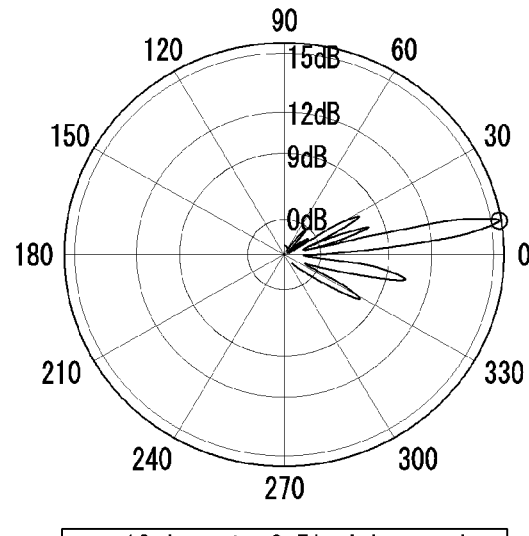

【FIG. 39b】
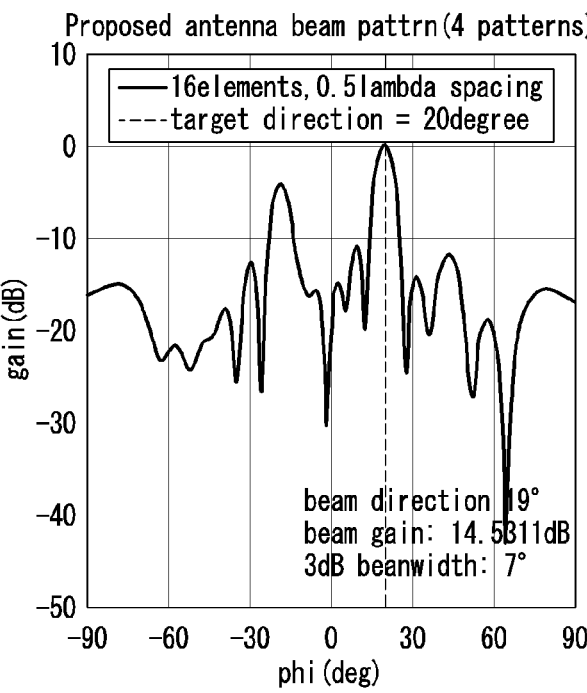
Proposed antenna beam pattrn(4 patterns)
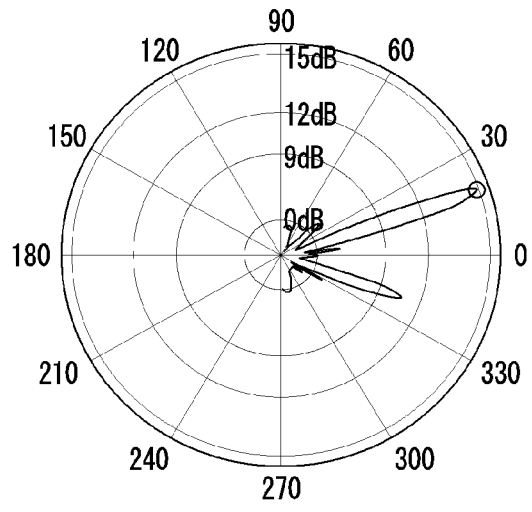
Proposed antenna beam pattrn(4 patterns)

【FIG. 39c】
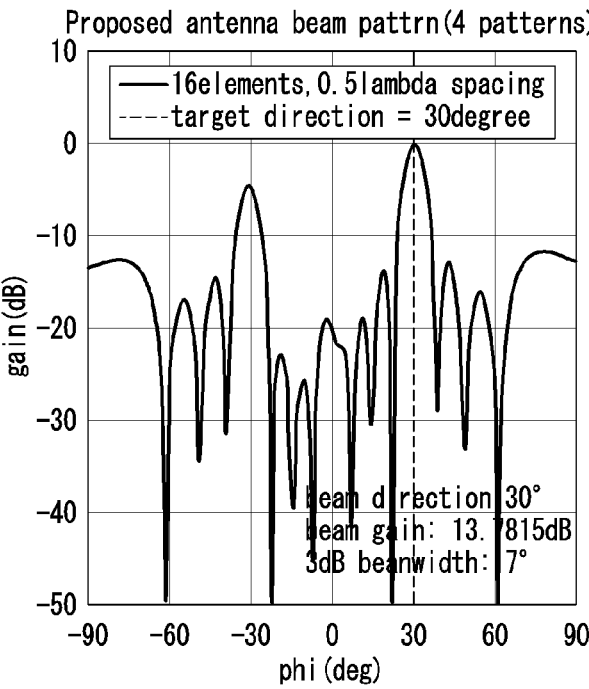
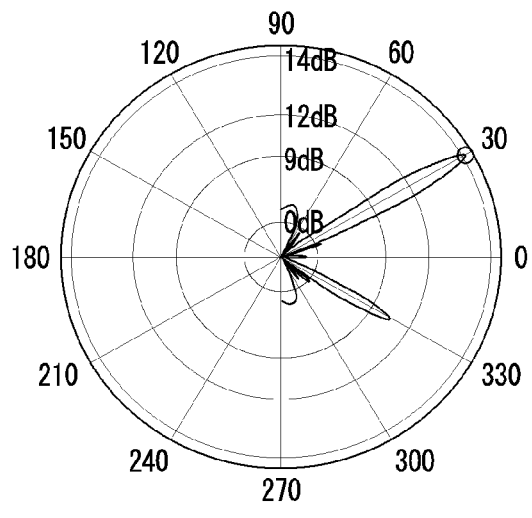

【FIG. 40】
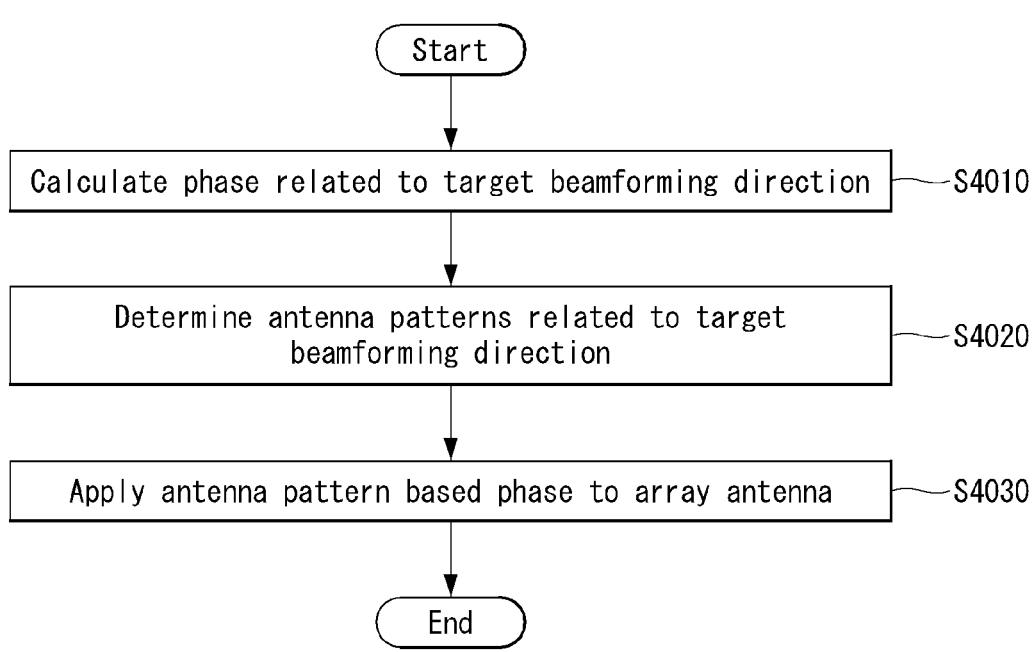

【FIG. 41】
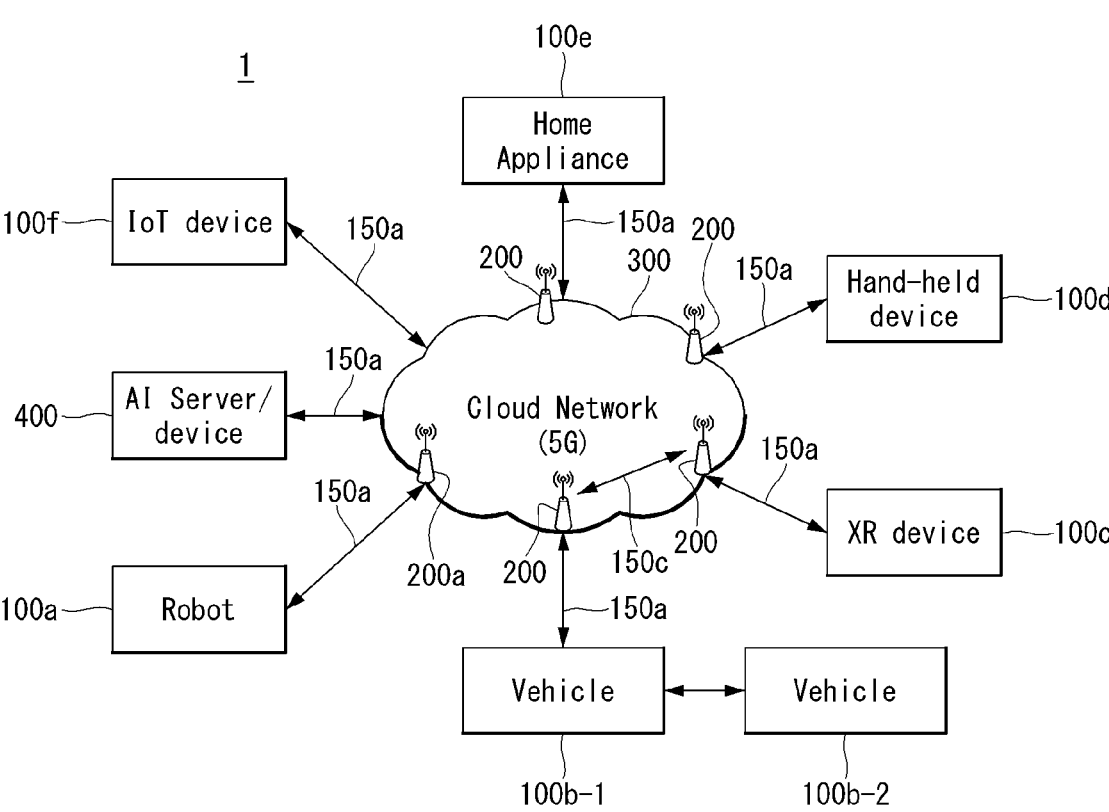

【FIG. 42】
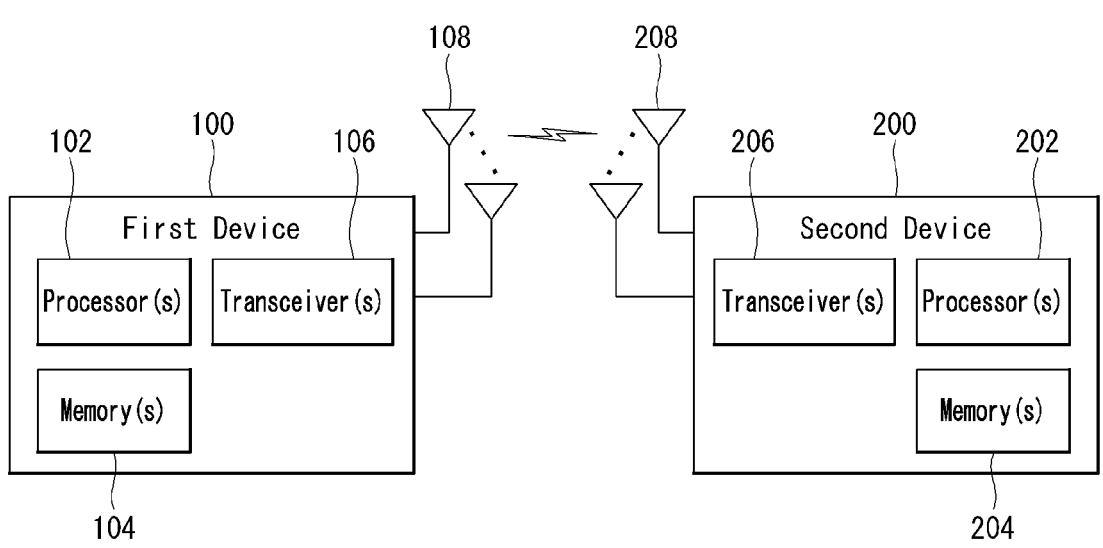

【FIG. 43】
1000(102/106, 202/206)
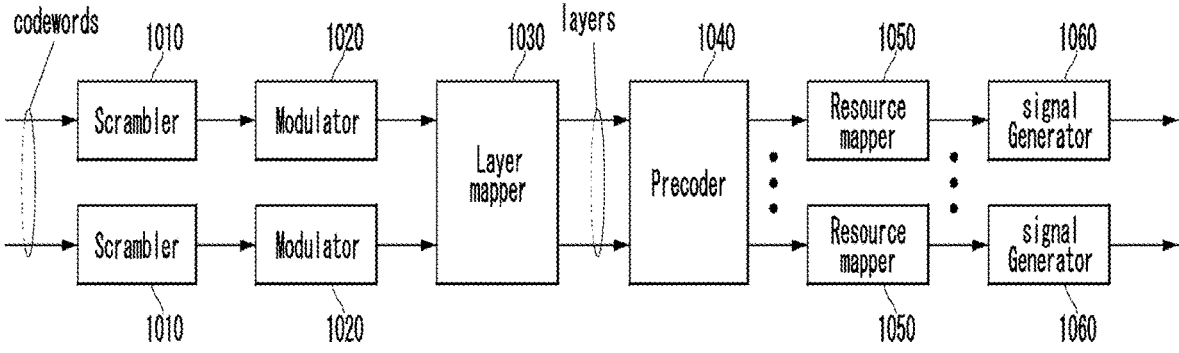

【FIG. 44】
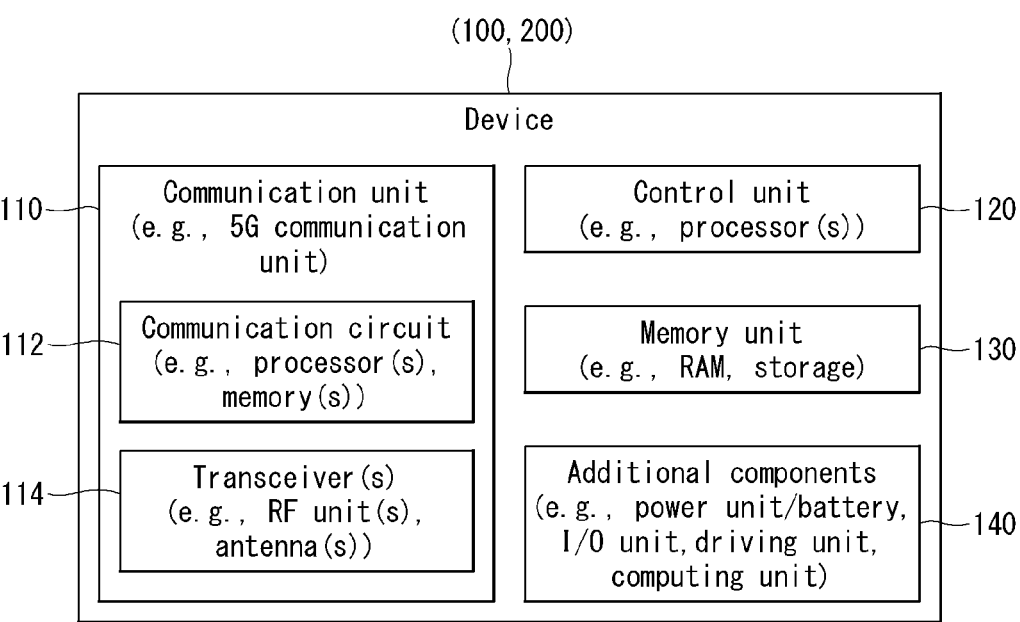

【FIG. 45】
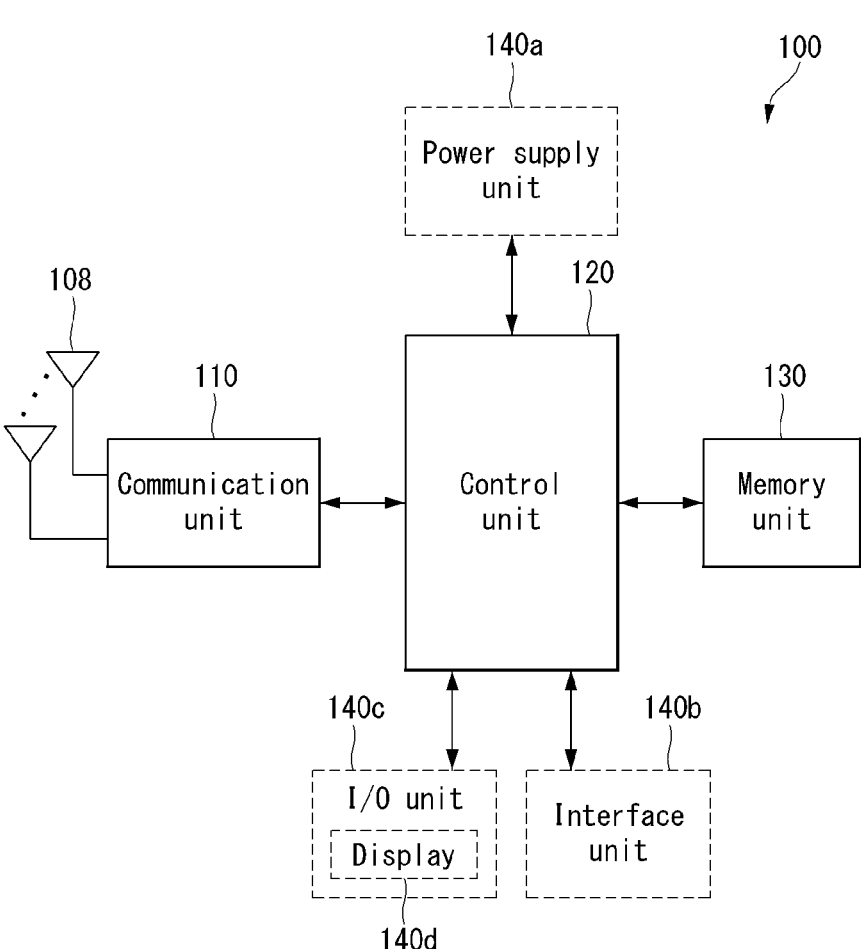

BEAMFORMING METHOD AND DEVICE IN WIRELESS COMMUNICATION SYSTEM

CROSS-REFERENCE TO RELATED APPLICATIONS

This application is the National Stage filing under 35 U.S.C. 371 of International Application No. PCT/KR2020/009057, filed on Jul. 9, 2020, the contents of which are all hereby incorporated by reference herein in their entirety.

TECHNICAL FIELD

The present disclosure relates to a beamforming method and a device thereof in a wireless communication system.

BACKGROUND

A mobile communication system was developed to provide a voice service while ensuring the activity of a user. However, the area of the mobile communication system has extended up to data services in addition to voice. Due to a current explosive increase in traffic, there is a shortage of resources. Accordingly, there is a need for a more advanced mobile communication system because users demand higher speed services.

Requirements for a next-generation mobile communication system need to able to support the accommodation of explosive data traffic, a dramatic increase in the data rate per user, the accommodation of a significant increase in the number of connected devices, very low end-to-end latency, and high-energy efficiency. To this end, various technologies, such as dual connectivity, massive multiple input multiple output (MIMO), in-band full duplex, non-orthogonal multiple access (NOMA), the support of a super wide-band, and device networking, are researched.

SUMMARY

The present disclosure provides a beamforming method and a device thereof.

Beamforming in the prior art is performed based on a phase shifter connected to an antenna. In the case of the THz band, a small-sized antenna is configured as a massive array antenna to obtain a large beam gain. In this case, as a phase modulation is connected to each antenna, power consumption becomes very large, a heating problem occurs, and power loss occurs due to insertion loss of the phase shifter. In the THz band, it is difficult to constitute a beamforming system using the phase shifter.

Meanwhile, a technique for performing beamforming without using the phase shifter has been proposed. A pattern reconfigurable antenna is an antenna whose radiation pattern can be adjusted in various ways. There are several ways to obtain pattern reconfigurability, and representatively, there is a method of selecting a parasitic element through a switch, and a method of controlling the radiation pattern by connecting a reactively loaded element to a parasitic element called Electronically Steerable Parasitic Array Radiator (ES-PAR).

However, both the method using the parasitic element switching and the method using the ESPAR require a plurality of parasitic antennas to be disposed around the main antenna. Accordingly, since the volume of the unit antenna increases, it is impossible to expand the array. In addition, in the case of existing pattern reconfigurable antennas, there is a limitation that the number of radiation directions that can be changed according to the number of parasitic elements is limited.

Accordingly, the present disclosure provides a beamforming method and a device thereof capable of solving the above-described problems of the prior art.

The technical objects of the present disclosure are not limited to the aforementioned technical objects, and other technical objects, which are not mentioned above, will be apparently appreciated by a person having ordinary skill in the art from the following description.

Technical Solution

According to one embodiment of the present disclosure, an antenna includes: a radiating element; a plurality of feeding points to which a feeding line for applying a signal to the radiating element is connected; a switch turning on or off the signal applied to each feeding point among the plurality of feeding points; and a variable reactance element connected to at least one feeding point among the plurality of feeding points.

The plurality of feeding points includes at least one first feeding point disposed at a first location, and at least one second feeding point disposed at a second location different from the first location. The second feeding point is connected to the variable reactance element.

The first location may be positioned within a region formed based on a specific length from an edge of the radiating element, and the second location may be positioned outside the region.

The specific length may be based on ⅓ (one third) of a length from the edge up to an opposite edge.

The variable reactance element may be based on a chip inductor, a chip capacitor, or a varactor diode.

According to another embodiment of the present disclosure, a beamforming method performed by a wireless device including an array antenna in a wireless communication system includes: calculating a phase related to a target beamforming direction; determining antenna patterns related to the target beamforming direction among antenna patterns preconfigured in relation to beamforming; and applying, to the array antenna, an antenna pattern based on the phase among the antenna patterns related to the target beamforming direction.

Each antenna included in the array antenna includes a plurality of feeding points and a variable reactance element connected to at least one feeding point among the plurality of feeding points. The antenna pattern is related to at least one of i) a selection of at least one feeding point among the plurality of feeding points or ii) a reactance value of the variable reactance element.

The antenna pattern may include information related to at least one of the selection of at least one feeding point, the reactance value, a peak gain direction, or a polarization phase.

The peak gain direction of the antenna patterns related to the target beamforming direction may belong to a specific range based on the target beamforming direction.

Information related to the polarization phase may include a 3D matrix based on the antenna pattern, and the 3D matrix may include an elevation angle, an azimuth angle, and a polarization phase based on the elevation angle and the azimuth angle.

The antenna pattern based on the phase may be based on an antenna pattern in which a difference between i) the polarization phase determined based on the target beamforming direction and the 3D matrix, and ii) the phase is minimal.

The phase may be calculated for each antenna included in the array antenna, the information related to the selection of at least one feeding point may be based on a bitmap representing on or off of each antenna, and the information related to the reactance value may include a reactance value of each antenna.

The application of the antenna pattern based on the phase may be based on the bitmap and the reactance value of each antenna.

According to yet another embodiment of the present disclosure, a wireless device performing beamforming in a wireless communication system includes: an array antenna; one or more transceivers transmitting and receiving radio signals through the array antenna; one or more processors controlling the array antenna and the one or more transceivers; and one or more memories operatively connectable to the one or more processors, and storing instructions of performing operations when the beamforming is executed by the one or more processors.

The operations include calculating a phase related to a target beamforming direction, determining antenna patterns related to the target beamforming direction among antenna patterns preconfigured in relation to beamforming, and applying, to the array antenna, an antenna pattern based on the phase among the antenna patterns related to the target beamforming direction.

Each antenna included in the array antenna includes a plurality of feeding points and a variable reactance element connected to at least one feeding point among the plurality of feeding points. The antenna pattern is related to at least one of i) a selection of at least one feeding point among the plurality of feeding points or ii) a reactance value of the variable reactance element.

The antenna pattern may include information related to at least one of the selection of at least one feeding point, the reactance value, a peak gain direction, or a polarization phase.

According to still yet another embodiment of the present disclosure, in one or more non-transitory computer-readable media storing one or more instructions, one or more instructions executable by one or more processors are configured to instruct a device to calculate a phase related to a target beamforming direction; determine antenna patterns related to the target beamforming direction among antenna patterns preconfigured in relation to beamforming, and apply, to the array antenna, an antenna pattern based on the phase among the antenna patterns related to the target beamforming direction.

Each antenna included in the array antenna includes a plurality of feeding points and a variable reactance element connected to at least one feeding point among the plurality of feeding points. The antenna pattern is related to at least one of i) a selection of at least one feeding point among the plurality of feeding points or ii) a reactance value of the variable reactance element.

The antenna pattern may include information related to at least one of the selection of at least one feeding point, the reactance value, a peak gain direction, or a polarization phase.

According to one embodiment of the present disclosure, disclosed is an antenna including a plurality of feeding points, a switch for turning on or off the signal applied to each feeding point among the plurality of feeding points, and a variable reactance element connected to at least one of the plurality of feeding points. Therefore, based on the antenna, a beamforming system can be effectively configured without problems due to power or heat generation. That is, size, power consumption, complexity and cost are reduced in implementing the beamforming system.

According to an embodiment of the present disclosure, the plurality of feeding points includes at least one first feeding point disposed at a first location and at least one second feeding point disposed at a second location different from the first location, and the second feeding point is connected to the variable reactance element. The pattern reconfigurability of the antenna can be obtained by selecting the feeding points and adjusting a reactance value without adding a parasitic antenna or other components to the radiating element. Therefore, the antenna according to the embodiment can generate various radiation patterns and is easy to use as a module for configuring a massive array antenna.

According to an embodiment of the present disclosure, beamforming is performed by applying an antenna pattern based on a phase weight among antenna patterns related to a target beamforming direction to an array antenna. In this case, the antenna pattern is related to at least one of i) a selection of at least one feeding point among the multiple feeding points or ii) a reactance value of the variable reactance element. Therefore, beamforming can be effectively performed based on an array antenna that does not use a phase shifter. Specifically, 1) in performing beamforming, since the number of radiation patterns that can be generated is not limited unlike conventional pattern reconfigurable antennas, radiation patterns having various directions and phases can be generated. 2) Since problems of power consumption and insertion loss due to the phase shifter do not occur, beamforming can be effectively performed even in the terahertz band.

Effects which may be obtained from the present disclosure are not limited by the above effects, and other effects that have not been mentioned may be clearly understood from the above description by those skilled in the art to which the present disclosure pertains.

BRIEF DESCRIPTION OF THE DRAWINGS

FIG. 1 illustrates physical channels and general signal transmission used in a 3GPP system.

FIG. 2 is a view showing an example of a communication structure providable in a 6G system applicable to the present disclosure.

FIG. 3 illustrates a structure of a perceptron to which the method proposed in the present disclosure can be applied.

FIG. 4 illustrates the structure of a multilayer perceptron to which the method proposed in the present disclosure can be applied.

FIG. 5 illustrates a structure of a deep neural network to which the method proposed in the present disclosure can be applied.

FIG. 6 illustrates the structure of a convolutional neural network to which the method proposed in the present disclosure can be applied.

FIG. 7 illustrates a filter operation in a convolutional neural network to which the method proposed in the present disclosure can be applied.

FIG. 8 illustrates a neural network structure in which a circular loop to which the method proposed in the present disclosure can be applied.

FIG. 9 illustrates an operation structure of a recurrent neural network to which the method proposed in the present disclosure can be applied.

FIG. 10 is a view showing an electromagnetic spectrum applicable to the present disclosure.

FIG. 11 is a view showing a THz communication method applicable to the present disclosure.

FIG. 12 is a view showing a THz wireless communication transceiver applicable to the present disclosure.

FIG. 13 is a view showing a THz signal generation method applicable to the present disclosure.

FIG. 14 is a view showing a wireless communication transceiver applicable to the present disclosure.

FIG. 15 is a view showing a transmitter structure based on a photonic source applicable to the present disclosure.

FIG. 16 is a view showing an optical modulator structure applicable to the present disclosure.

FIG. 17 illustrates a radiation pattern of an antenna.

FIG. 18 is a diagram illustrating positional movement of an antenna and a feeding point according to an embodiment of the present disclosure.

FIG. 19 is a graph showing input impedance and reflection coefficient according to a location of a feeding point of an antenna according to an embodiment of the present disclosure.

FIG. 20 is a diagram illustrating a region where a feeding point of an antenna according to an embodiment of the present disclosure is positioned.

FIGS. 21 and 22 illustrate a type 1 feeding point configuration of an antenna according to an embodiment of the present disclosure.

FIGS. 23 and 24 illustrate a type 1 feeding point configuration and a type 2 feeding point configuration of an antenna according to an embodiment of the present disclosure.

FIGS. 25 and 26 illustrate configurations of a feeding point and a variable reactance element of an antenna according to an embodiment of the present disclosure.

FIG. 27 illustrates a structure of an antenna including a variable reactance according to an embodiment of the present disclosure.

FIG. 28 is a diagram for describing a phase change of an antenna pattern according to a change in a variable reactance value in an antenna according to an embodiment of the present disclosure.

FIG. 29 is a diagram illustrating a change of a beam according to selection of a feeding point in an antenna according to an embodiment of the present disclosure.

FIG. 30 illustrates various feeding point configurations in an antenna according to an embodiment of the disclosure.

FIG. 31 illustrates an antenna according an embodiment of the present disclosure.

FIG. 32 is a diagram for describing mapping of antenna patterns according to an embodiment of the present disclosure.

FIG. 33 is a diagram for describing application of an antenna pattern according to an embodiment of the present disclosure.

FIG. 34 is a flowchart for describing a beamforming method according to an embodiment of the present disclosure.

FIG. 35 illustrates a block diagram of a beamforming system using an existing phase shifter.

FIG. 37 illustrates a block diagram of a beamforming system based on an embodiment of the present disclosure.

FIGS. 38a to 38c and FIGS. 39a to 39c are diagrams illustrating simulation results using a 1×16 array antenna according to an embodiment of the present disclosure.

FIG. 40 is a flowchart for describing a beamforming method performed by a wireless device having an array antenna in a wireless communication system according to an embodiment of the present disclosure.

FIG. 41 illustrates a communication system 1 applied to the present disclosure.

FIG. 42 illustrates wireless devices applicable to the present disclosure.

FIG. 43 illustrates a signal process circuit for a transmission signal applied to the present disclosure.

FIG. 44 illustrates another example of a wireless device applied to the present disclosure.

FIG. 45 illustrates a hand-held device applied to the present disclosure.

DETAILED DESCRIPTION

Figure 301:
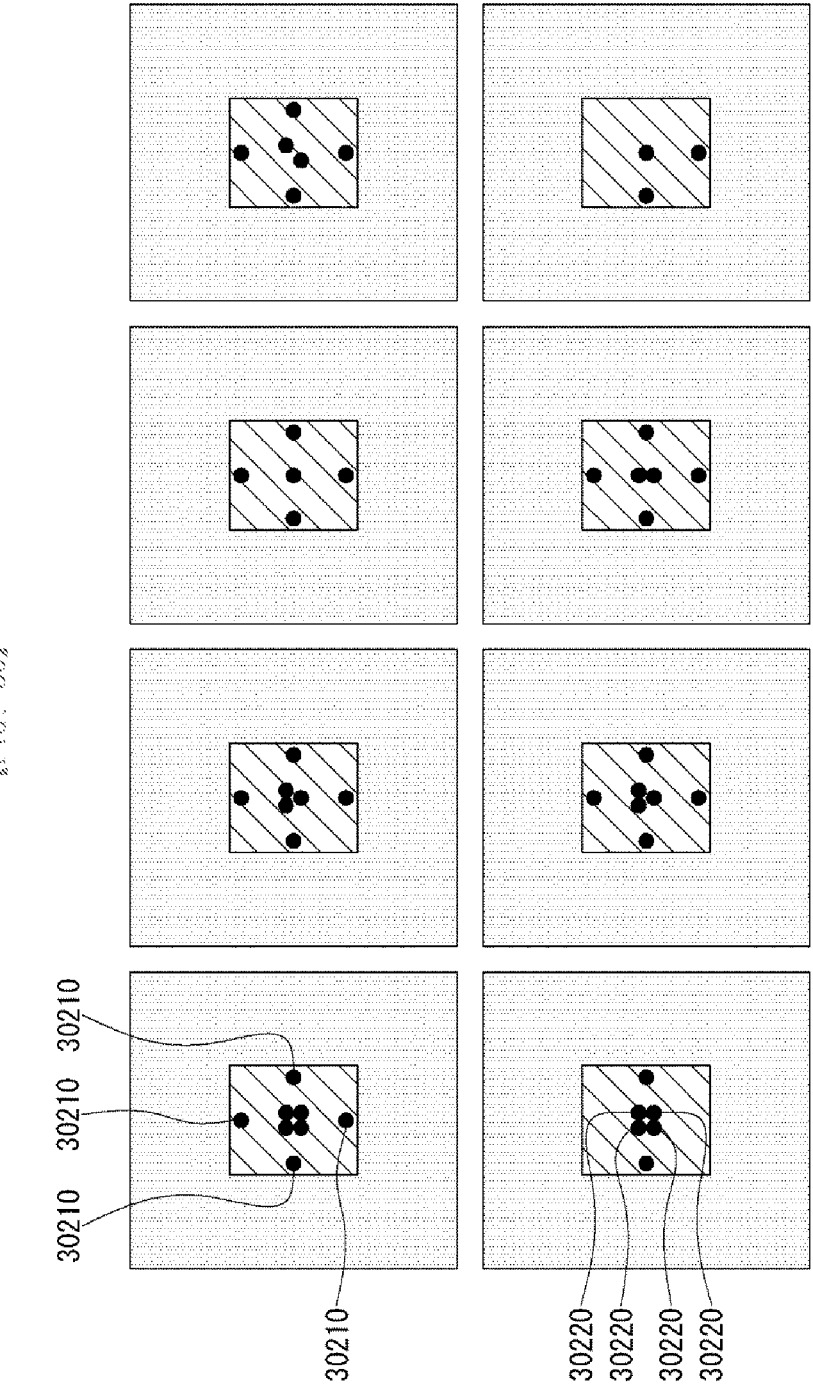

Hereinafter, embodiments disclosed in the present disclosure will be described in detail with reference to the accompanying drawings, but the same or similar components are denoted by the same and similar reference numerals, and redundant descriptions thereof will be omitted. The suffixes "module" and "unit" for components used in the following description are given or used interchangeably in consideration of only the ease of preparation of the specification, and do not have meanings or roles that are distinguished from each other by themselves. In addition, in describing the embodiments disclosed in the present disclosure, when it is determined that a detailed description of related known technologies may obscure the subject matter of the embodiments disclosed in the present disclosure, the detailed description thereof will be omitted. In addition, the accompanying drawings are for easy understanding of the embodiments disclosed in the present disclosure, and the technical idea disclosed in the present disclosure is not limited by the accompanying drawings, and all modifications included in the spirit and scope of the present disclosure, It should be understood to include equivalents or substitutes.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), an access point (AP), or generation NB (general NB, gNB). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

For clarity, the description is based on a 3GPP communication system (eg, LTE, NR, etc.), but the technical idea of the present disclosure is not limited thereto. LTE refers to the technology after 3GPP TS 36.xxx Release 8. In detail, LTE technology after 3GPP TS 36.xxx Release 10 is referred to as LTE-A, and LTE technology after 3GPP TS 36.xxx Release 13 is referred to as LTE-A pro. 3GPP NR refers to the technology after TS 38.xxx Release 15. 3GPP 6G may mean technology after TS Release 17 and/or Release 18. "xxx" means standard document detail number. LTE/NR/6G may be collectively referred to as a 3GPP system. Background art, terms, abbreviations, and the like used in the description of the present disclosure may refer to matters described in standard documents published before the present disclosure. For example, you can refer to the following document:

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
38.331: Radio Resource Control (RRC) protocol specification
Physical Channel and Frame Structure
Physical Channels and General Signal Transmission
FIG. 1 illustrates physical channels and general signal transmission used in a 3GPP system. In a wireless communication system, a terminal receives information from a base station through a downlink (DL), and the terminal transmits information to the base station through an uplink (UL). The information transmitted and received by the base station and the terminal includes data and various control information, and various physical channels exist according to the type/use of information transmitted and received by them.

When the terminal is powered on or newly enters a cell, the terminal performs an initial cell search operation such as synchronizing with the base station (S101). To this end, the UE receives a Primary Synchronization Signal (PSS) and a Secondary Synchronization Signal (SSS) from the base station to synchronize with the base station and obtain information such as cell ID. Thereafter, the terminal may receive a physical broadcast channel (PBCH) from the base station to obtain intra-cell broadcast information. Meanwhile, the UE may receive a downlink reference signal (DL RS) in the initial cell search step to check a downlink channel state.

After completing the initial cell search, the UE receives a physical downlink control channel (PDCCH) and a physical downlink shared channel (PDSCH) according to the information carried on the PDCCH, thereby receiving a more specific system Information can be obtained (S102).

On the other hand, when accessing the base station for the first time or when there is no radio resource for signal transmission, the terminal may perform a random access procedure (RACH) for the base station (S103 to S106). To this end, the UE transmits a specific sequence as a preamble through a physical random access channel (PRACH) (S103 and S105), and a response message to the preamble through a PDCCH and a corresponding PDSCH (RAR (Random Access Response) message) In the case of contention-based RACH, a contention resolution procedure may be additionally performed (S106).

After performing the above-described procedure, the UE receives PDCCH/PDSCH (S107) and physical uplink shared channel (PUSCH)/physical uplink control channel as a general uplink/downlink signal transmission procedure. (Physical Uplink Control Channel; PUCCH) transmission (S108) can be performed. In particular, the terminal may receive downlink control information (DCI) through the PDCCH. Here, the DCI includes control information such as resource allocation information for the terminal, and different formats may be applied according to the purpose of use.

On the other hand, control information transmitted by the terminal to the base station through uplink or received by the terminal from the base station is a downlink/uplink ACK/NACK signal, a channel quality indicator (CQI), a precoding matrix index (PMI), and (Rank Indicator) may be included. The terminal may transmit control information such as CQI/PMI/RI described above through PUSCH and/or PUCCH.

Structure of Uplink and Downlink Channels
Downlink Channel Structure
The base station transmits a related signal to the terminal through a downlink channel to be described later, and the terminal receives a related signal from the base station through a downlink channel to be described later.
(1) Physical Downlink Shared Channel (PDSCH)
PDSCH carries downlink data (eg, DL-shared channel transport block, DL-SCH TB), and includes Quadrature Phase Shift Keying (QPSK), Quadrature Amplitude Modulation (QAM), 64 QAM, 256 QAM, etc. The modulation method is applied. A codeword is generated by encoding TB. The PDSCH can carry multiple codewords. Scrambling and modulation mapping are performed for each codeword, and modulation symbols generated from each codeword are mapped to one or more layers (Layer mapping). Each layer is mapped to a resource together with a demodulation reference signal (DMRS) to generate an OFDM symbol signal, and is transmitted through a corresponding antenna port.

(2) Physical Downlink Control Channel (PDCCH)

The PDCCH carries downlink control information (DCI) and a QPSK modulation method is applied. One PDCCH is composed of 1, 2, 4, 8, 16 Control Channel Elements (CCEs) according to the Aggregation Level (AL). One CCE consists of 6 REGs (Resource Element Group). One REG is defined by one OFDM symbol and one (P)RB.

The UE acquires DCI transmitted through the PDCCH by performing decoding (aka, blind decoding) on the set of PDCCH candidates. The set of PDCCH candidates decoded by the UE is defined as a PDCCH search space set. The search space set may be a common search space or a UE-specific search space. The UE may acquire DCI by monitoring PDCCH candidates in one or more search space sets set by MIB or higher layer signaling.

Uplink Channel Structure

The terminal transmits a related signal to the base station through an uplink channel to be described later, and the base station receives a related signal from the terminal through an uplink channel to be described later.

(1) Physical Uplink Shared Channel (PUSCH)

PUSCH carries uplink data (eg, UL-shared channel transport block, UL-SCH TB) and/or uplink control information (UCI), and CP-OFDM (Cyclic Prefix-Orthogonal Frequency Division Multiplexing) waveform (waveform), DFT-s-OFDM (Discrete Fourier Transform-spread-Orthogonal Frequency Division Multiplexing) is transmitted based on the waveform. When the PUSCH is transmitted based on the DFT-s-OFDM waveform, the UE transmits the PUSCH by applying transform precoding. For example, when transform precoding is not possible (eg, transform precoding is disabled), the UE transmits a PUSCH based on the CP-OFDM waveform, and when transform precoding is possible (eg, transform precoding is enabled), the UE is CP-OFDM. PUSCH may be transmitted based on a waveform or a DFT-s-OFDM waveform. PUSCH transmission is dynamically scheduled by the UL grant in the DCI or is semi-static based on higher layer (e.g., RRC) signaling (and/or Layer 1 (L1) signaling (e.g., PDCCH)). Can be scheduled (configured grant). PUSCH transmission may be performed based on a codebook or a non-codebook.

(2) Physical Uplink Control Channel (PUCCH)

The PUCCH carries uplink control information, HARQ-ACK, and/or scheduling request (SR), and may be divided into a plurality of PUCCHs according to the PUCCH transmission length.

6G System General

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 1 below. That is, Table 1 shows the requirements of the 6G system.

10

TABLE 1

| Per device peak data rate | 1 Tbps |
|---|---|
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

At this time, the 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

FIG. 2 is a view showing an example of a communication structure providable in a 6G system applicable to the present disclosure.

Referring to FIG. 2, the 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, wireless information and energy transfer (WIET) will be integrated.

Ubiquitous super 3-dimemtion connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduce costs.

High-capacity backhaul: Backhaul connection is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability.

Core Implementation Technology of 6G System

Artificial Intelligence (AI)

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

However, application of a deep neutral network (DNN) for transmission in the physical layer may have the following problems.

Deep learning-based AI algorithms require a lot of training data in order to optimize training parameters. However, due to limitations in acquiring data in a specific channel environment as training data, a lot of training data is used offline. Static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to create a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmman machine (RNN) method. Such a learning model is applicable.

An artificial neural network is an example of connecting several perceptrons.

FIG. 3 illustrates a structure of a perceptron to which the method proposed in the present disclosure can be applied.

Referring to FIG. 3, when an input vector x=(x1, x2, . . . , xd) is input, each component is multiplied by a weight (W1, W2, . . . , Wd), and all the results are summed. After that, the entire process of applying the activation function $\sigma(\cdot)$ is called a perceptron. The huge artificial neural network structure may extend the simplified perceptron structure shown in FIG. 3 to apply input vectors to different multi-dimensional perceptrons. For convenience of explanation, an input value or an output value is referred to as a node.

Meanwhile, the perceptron structure illustrated in FIG. 3 may be described as being composed of a total of three layers based on an input value and an output value. An artificial neural network in which H (d+1) dimensional perceptrons exist between the 1st layer and the 2nd layer, and K (H+1) dimensional perceptrons exist between the 2nd layer and the 3rd layer, as shown in FIG. 4.

FIG. 4 illustrates the structure of a multilayer perceptron to which the method proposed in the present disclosure can be applied.

The layer where the input vector is located is called an input layer, the layer where the final output value is located is called the output layer, and all layers located between the input layer and the output layer are called a hidden layer. In the example of FIG. 4, three layers are disclosed, but since the number of layers of the artificial neural network is counted excluding the input layer, it can be viewed as a total of two layers. The artificial neural network is constructed by connecting the perceptrons of the basic blocks in two dimensions.

The above-described input layer, hidden layer, and output layer can be jointly applied in various artificial neural network structures such as CNN and RNN to be described later as well as multilayer perceptrons. The greater the number of hidden layers, the deeper the artificial neural network is, and the machine learning paradigm that uses the deep enough artificial neural network as a learning model is called Deep Learning. In addition, the artificial neural network used for deep learning is called a deep neural network (DNN).

FIG. 5 illustrates a structure of a deep neural network to which the method proposed in the present disclosure can be applied.

The deep neural network shown in FIG. 5 is a multilayer perceptron composed of eight hidden layers+output layers. The multilayer perceptron structure is expressed as a fully-connected neural network. In a fully connected neural network, a connection relationship does not exist between nodes located on the same layer, and a connection relationship exists only between nodes located on adjacent layers. DNN has a fully connected neural network structure and is composed of a combination of multiple hidden layers and activation functions, so it can be usefully applied to understand the correlation characteristics between input and output. Here, the correlation characteristic may mean a joint probability of input/output.

'On the other hand, depending on how the plurality of perceptrons are connected to each other, various artificial neural network structures different from the aforementioned DNN can be formed.

In a DNN, nodes located inside one layer are arranged in a one-dimensional vertical direction. However, in FIG. 6, it may be assumed that w nodes are arranged in two dimensions, and h nodes are arranged in a two-dimensional manner (convolutional neural network structure of FIG. 6). In this case, since a weight is added per connection in the connection process from one input node to the hidden layer, a total of h×w weights must be considered. Since there are h×w nodes in the input layer, a total of h2w2 weights are required between two adjacent layers.

FIG. 6 illustrates the structure of a convolutional neural network to which the method proposed in the present disclosure can be applied.

The convolutional neural network of FIG. 6 has a problem in that the number of weights increases exponentially according to the number of connections, so instead of considering the connection of all modes between adjacent layers, it is assumed that a filter having a small size exists. Thus, as shown in FIG. 7, weighted sum and activation function calculations are performed on a portion where the filters overlap.

One filter has a weight corresponding to the number as much as the size, and learning of the weight may be performed so that a certain feature on an image can be extracted and output as a factor. In FIG. 7, a filter having a size of 3×3 is applied to the upper leftmost 3×3 area of the input layer, and an output value obtained by performing a weighted sum and activation function operation for a corresponding node is stored in z22.

While scanning the input layer, the filter performs weighted summation and activation function calculation while moving horizontally and vertically by a predetermined interval, and places the output value at the position of the current filter. This method of operation is similar to the convolution operation on images in the field of computer vision, so a deep neural network with this structure is called a convolutional neural network (CNN), and a hidden layer generated as a result of the convolution operation. Is referred to as a convolutional layer. In addition, a neural network in which a plurality of convolutional layers exists is referred to as a deep convolutional neural network (DCNN).

FIG. 7 illustrates a filter operation in a convolutional neural network to which the method proposed in the present disclosure can be applied.

In the convolutional layer, the number of weights may be reduced by calculating a weighted sum by including only nodes located in a region covered by the filter in the node where the current filter is located. Due to this, one filter can be used to focus on features for the local area. Accordingly, the CNN can be effectively applied to image data processing in which the physical distance in the 2D area is an important criterion. Meanwhile, in the CNN, a plurality of filters may be applied immediately before the convolution layer, and a plurality of output results may be generated through a convolution operation of each filter.

Meanwhile, there may be data whose sequence characteristics are important according to data properties. Considering the length variability of the sequence data and the relationship between the sequence data, one element in the data sequence is input at each timestep, and the output vector (hidden vector) of the hidden layer output at a specific time point is input together with the next element in the sequence.

The structure applied to the artificial neural network is called a recurrent neural network structure.

FIG. 8 illustrates a neural network structure in which a circular loop to which the method proposed in the present disclosure can be applied.

Referring to FIG. 8, a recurrent neural netwok (RNN) is a fully connected neural network with elements $(x1(t), x2(t), \ldots, xd(t))$ of any line of sight t on a data sequence. In the process of inputting, the point t−1 immediately preceding is the weighted sum and activation function by inputting the hidden vectors $(z1(t-1), z2(t-1), \ldots, zH(t-1))$ together. It is a structure to be applied. The reason for transferring the hidden vector to the next view in this way is that information in the input vector at the previous views is regarded as accumulated in the hidden vector of the current view.

FIG. 9 illustrates an operation structure of a recurrent neural network to which the method proposed in the present disclosure can be applied.

Referring to FIG. 9, the recurrent neural network operates in a predetermined order of time with respect to an input data sequence.

Hidden vectors $(z1(1), z2(1), \ldots, zH(1))$ is input with the input vector $(x1(2), x2(2), \ldots, xd(2))$ of the time point 2, and the vector $(z1(2), z2(2), \ldots, zH(2))$ is determined. This process is repeatedly performed up to the time point 2, time point 3, , , , , time point T.

Meanwhile, when a plurality of hidden layers are disposed in a recurrent neural network, this is referred to as a deep recurrent neural network (DRNN). The recurrent neural network is designed to be usefully applied to sequence data (for example, natural language processing).

As a neural network core used as a learning method, in addition to DNN, CNN, and RNN, Restricted Boltzmann Machine (RBM), deep belief networks (DBN), and deep Q-networks Network), and can be applied to fields such as computer vision, speech recognition, natural language processing, and voice/signal processing.

In recent years, attempts to integrate AI with a wireless communication system have appeared, but this has been concentrated in the field of wireless resource management and allocation in the application layer, network layer, in particular, deep learning. However, such research is gradually developing into the MAC layer and the physical layer, and in particular, attempts to combine deep learning with wireless transmission in the physical layer have appeared. The AI-based physical layer transmission refers to applying a signal processing and communication mechanism based on an AI driver rather than a traditional communication framework in the fundamental signal processing and communication mechanism. For example, deep learning-based channel coding and decoding, deep learning-based signal estimation and detection, deep learning-based M IMO mechanism, AI-based resource scheduling, and It may include allocation and the like.

Terahertz (THz) Communication

THz communication is applicable to the 6G system. For example, a data rate may increase by increasing bandwidth. This may be performed by using sub-TH communication with wide bandwidth and applying advanced massive MIMO technology. THz waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF.

The main characteristics of THz communication include (i) bandwidth widely available to support a very high data rate and (ii) high path loss occurring at a high frequency (a high directional antenna is indispensable). A narrow beam width generated in the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

Optical Wireless Technology

Optical wireless communication (OWC) technology is planned for 6G communication in addition to RF based communication for all possible device-to-access networks. This network is connected to a network-to-backhaul/fronthaul network connection. OWC technology has already been used since 4G communication systems but will be more widely used to satisfy the requirements of the 6G communication system. OWC technologies such as light fidelity/visible light communication, optical camera communication and free space optical (FSO) communication based on wide band are well-known technologies. Communication based on optical wireless technology may provide a very high data rate, low latency and safe communication. Light detection and ranging (LiDAR) may also be used for ultra high resolution 3D mapping in 6G communication based on wide band.

FSO Backhaul Network

The characteristics of the transmitter and receiver of the FSO system are similar to those of an optical fiber network. Accordingly, data transmission of the FSO system similar to that of the optical fiber system. Accordingly, FSO may be a good technology for providing backhaul connection in the 6G system along with the optical fiber network. When FSO is used, very long-distance communication is possible even at a distance of 10,000 km or more. FSO supports mass backhaul connections for remote and non-remote areas such as sea, space, underwater and isolated islands. FSO also supports cellular base station connections.

Massive MIMO Technology

One of core technologies for improving spectrum efficiency is MIMO technology. When MIMO technology is improved, spectrum efficiency is also improved. Accordingly, massive MIMO technology will be important in the 6G system. Since MIMO technology uses multiple paths, multiplexing technology and beam generation and management technology suitable for the THz band should be significantly considered such that data signals are transmitted through one or more paths.

Blockchain

A blockchain will be important technology for managing large amounts of data in future communication systems. The blockchain is a form of distributed ledger technology, and distributed ledger is a database distributed across numerous nodes or computing devices. Each node duplicates and stores the same copy of the ledger. The blockchain is managed through a peer-to-peer (P2P) network. This may exist without being managed by a centralized institution or server. Blockchain data is collected together and organized into blocks. The blocks are connected to each other and protected using encryption. The blockchain completely complements large-scale IoT through improved interoperability, security, privacy, stability and scalability. Accordingly, the blockchain technology provides several functions such as interoperability between devices, high-capacity data traceability, autonomous interaction of different IoT systems, and large-scale connection stability of 6G communication systems.

3D Networking

The 6G system integrates terrestrial and public networks to support vertical expansion of user communication. A 3D BS will be provided through low-orbit satellites and UAVs. Adding new dimensions in terms of altitude and related degrees of freedom makes 3D connections significantly different from existing 2D networks.

Quantum Communication

In the context of the 6G network, unsupervised reinforcement learning of the network is promising. The supervised learning method cannot label the vast amount of data generated in 6G. Labeling is not required for unsupervised learning. Thus, this technique can be used to autonomously build a representation of a complex network. Combining reinforcement learning with unsupervised learning may enable the network to operate in a truly autonomous way.

Unmanned Aerial Vehicle

An unmanned aerial vehicle (UAV) or drone will be an important factor in 6G wireless communication. In most cases, a high-speed data wireless connection is provided using UAV technology. A base station entity is installed in the UAV to provide cellular connectivity. UAVs have certain features, which are not found in fixed base station infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communications. This technology facilitates the three basic requirements of wireless networks, such as eMBB, URLLC and mMTC. The UAV can also serve a number of purposes, such as network connectivity improvement, fire detection, disaster emergency services, security and surveillance, pollution monitoring, parking monitoring, and accident monitoring. Therefore, UAV technology is recognized as one of the most important technologies for 6G communication.

Cell-Free Communication

The tight integration of multiple frequencies and heterogeneous communication technologies is very important in the 6G system. As a result, a user can seamlessly move from network to network without having to make any manual configuration in the device. The best network is automatically selected from the available communication technologies. This will break the limitations of the cell concept in wireless communication. Currently, user movement from one cell to another cell causes too many handovers in a high-density network, and causes handover failure, handover delay, data loss and ping-pong effects. 6G cell-free communication will overcome all of them and provide better QoS. Cell-free communication will be achieved through multi-connectivity and multi-tier hybrid technologies and different heterogeneous radios in the device.

Wireless Information and Energy Transfer (WIET)

WIET uses the same field and wave as a wireless communication system. In particular, a sensor and a smartphone will be charged using wireless power transfer during communication. WIET is a promising technology for extending the life of battery charging wireless systems. Therefore, devices without batteries will be supported in 6G communication.

Integration of Sensing and Communication

An autonomous wireless network is a function for continuously detecting a dynamically changing environment state and exchanging information between different nodes. In 6G, sensing will be tightly integrated with communication to support autonomous systems.

Integration of Access Backhaul Network

In 6G, the density of access networks will be enormous. Each access network is connected by optical fiber and backhaul connection such as FSO network. To cope with a very large number of access networks, there will be a tight integration between the access and backhaul networks.

Hologram Beamforming

Beamforming is a signal processing procedure that adjusts an antenna array to transmit radio signals in a specific direction. This is a subset of smart antennas or advanced antenna systems. Beamforming technology has several advantages, such as high signal-to-noise ratio, interference prevention and rejection, and high network efficiency. Hologram beamforming (HBF) is a new beamforming method that differs significantly from MIMO systems because this uses a software-defined antenna. HBF will be a very effective approach for efficient and flexible transmission and reception of signals in multi-antenna communication devices in 6G.

Big Data Analysis

Big data analysis is a complex process for analyzing various large data sets or big data. This process finds information such as hidden data, unknown correlations, and customer disposition to ensure complete data management. Big data is collected from various sources such as video, social networks, images and sensors. This technology is widely used for processing massive data in the 6G system.

Large Intelligent Surface (LIS)

In the case of the THz band signal, since the straightness is strong, there may be many shaded areas due to obstacles. By installing the LIS near these shaded areas, LIS technology that expands a communication area, enhances communication stability, and enables additional optional services becomes important. The LIS is an artificial surface made of electromagnetic materials, and can change propagation of incoming and outgoing radio waves. The LIS can be viewed as an extension of massive MIMO, but differs from the massive MIMO in array structures and operating mechanisms. In addition, the LIS has an advantage such as low power consumption, because this operates as a reconfigurable reflector with passive elements, that is, signals are only passively reflected without using active RF chains. In addition, since each of the passive reflectors of the LIS must independently adjust the phase shift of an incident signal, this may be advantageous for wireless communication channels. By properly adjusting the phase shift through an LIS controller, the reflected signal can be collected at a target receiver to boost the received signal power.

Terahertz (THz) Wireless Communications in General

THz wireless communication uses a THz wave having a frequency of approximately 0.1 to 10 THz (1 THz=1012 Hz), and may mean terahertz (THz) band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence. In addition, the photon energy of the THz wave is only a few meV and thus is harmless to the human body. A frequency band which will be used for THz wireless communication may be a D-band (110 GHz to 170 GHz) or a H-band (220 GHz to 325 GHz) band with low propagation loss due to molecular absorption in air. Standardization discussion on THz wireless communication is being discussed mainly in IEEE 802.15 THz working group (WG), in addition to 3GPP, and standard documents issued by a task group (TG) of IEEE 802.15 (e.g., TG3d, TG3e) specify and supplement the description of this disclosure. The THz wireless communication may be applied to wireless cognition, sensing, imaging, wireless communication, and THz navigation.

FIG. 11 is a view showing a THz communication method applicable to the present disclosure.

Referring to FIG. 11, a THz wireless communication scenario may be classified into a macro network, a micro network, and a nanoscale network. In the macro network, THz wireless communication may be applied to vehicle-to-vehicle (V2V) connection and backhaul/fronthaul connection. In the micro network, THz wireless communication may be applied to near-field communication such as indoor small cells, fixed point-to-point or multi-point connection such as wireless connection in a data center or kiosk downloading.

Table 2 below shows an example of technology which may be used in the THz wave.

TABLE 2

| Transceivers Device | Available immature: UTC-PD, RTD and SBD |
| Modulation and coding | Low order modulation techniques (OOK, QPSK), LDPC, Reed Soloman, Hamming, Polar, Turbo |
| Antenna | Omni and Directional, phased array with low number of antenna elements |
| Bandwidth | 69 GHz (or 23 GHz) at 300 GHz |
| Channel models | Partially |
| Data rate | 100 Gbps |
| Outdoor deployment | No |
| Free space loss | High |
| Coverage | Low |
| Radio Measurements | 300 GHz indoor |
| Device size | Few micrometers |

THz wireless communication can be classified based on a method for generating and receiving THz. The THz generation method can be classified as an optical device or an electronic device-based technology.

FIG. 12 is a view showing a THz wireless communication transceiver applicable to the present disclosure.

The method of generating THz using an electronic device includes a method using a semiconductor device such as a resonance tunneling diode (RTD), a method using a local oscillator and a multiplier, a monolithic microwave integrated circuit (MMIC) method using a compound semiconductor high electron mobility transistor (HEMT) based integrated circuit, and a method using a Si-CMOS-based integrated circuit. In the case of FIG. 18, a multiplier (doubler, tripler, multiplier) is applied to increase the frequency, and radiation is performed by an antenna through a subharmonic mixer. Since the THz band forms a high frequency, a multiplier is essential. Here, the multiplier is a circuit having an output frequency which is N times an input frequency, and matches a desired harmonic frequency, and filters out all other frequencies. In addition, beamforming may be implemented by applying an array antenna or the like to the antenna of FIG. 18. In FIG. 18, IF represents an intermediate frequency, a tripler and a multiplier represents a multiplier, PA represents a power amplifier, and LNA represents a low noise amplifier, and PLL represents a phase-locked loop.

FIG. 13 is a view showing a THz signal generation method applicable to the present disclosure and FIG. 14 is a view showing a wireless communication transceiver applicable to the present disclosure.

Referring to FIGS. 13 and 14, the optical device-based THz wireless communication technology means a method of generating and modulating a THz signal using an optical device. The optical device-based THz signal generation technology refers to a technology that generates an ultra-high-speed optical signal using a laser and an optical modulator, and converts it into a THz signal using an ultrahigh-speed photodetector. This technology is easy to increase the frequency compared to the technology using only the electronic device, can generate a high-power signal, and can obtain a flat response characteristic in a wide frequency band. In order to generate the THz signal based on the optical device, as shown in FIG. 13, a laser diode, a broadband optical modulator, and an ultrahigh-speed photodetector are required. In the case of FIG. 13, the light signals of two lasers having different wavelengths are combined to generate a THz signal corresponding to a wavelength difference between the lasers. In FIG. 13, an optical coupler refers to a semiconductor device that transmits an electrical signal using light waves to provide coupling with electrical isolation between circuits or systems, and a uni-travelling carrier photo-detector (UTC-PD) is one of photodetectors, which uses electrons as an active carrier and reduces the travel time of electrons by bandgap grading. The UTC-PD is capable of photodetection at 150 GHz or more. In FIG. 14, an erbium-doped fiber amplifier (EDFA) represents an optical fiber amplifier to which erbium is added, a photo detector (PD) represents a semiconductor device capable of converting an optical signal into an electrical signal, and OSA represents an optical sub assembly in which various optical communication functions (e.g., photoelectric conversion, electrophotic conversion, etc.) are modularized as one component, and DSO represents a digital storage oscilloscope.

The structure of a photoelectric converter (or photoelectric converter) will be described with reference to FIGS. 15 and 16. FIG. 15 is a view showing a transmitter structure based on a photonic source applicable to the present disclosure. FIG. 16 is a view showing an optical modulator structure applicable to the present disclosure.

generally, the optical source of the laser may change the phase of a signal by passing through the optical wave guide. At this time, data is carried by changing electrical characteristics through microwave contact or the like. Thus, the optical modulator output is formed in the form of a modulated waveform. A photoelectric modulator (O/E converter) may generate THz pulses according to optical rectification operation by a nonlinear crystal, photoelectric conversion (O/E conversion) by a photoconductive antenna, and emission from a bunch of relativistic electrons. The terahertz pulse (THz pulse) generated in the above manner may have a length of a unit from femto second to pico second. The photoelectric converter (O/E converter) performs down conversion using non-linearity of the device.

Given THz spectrum usage, multiple contiguous GHz bands are likely to be used as fixed or mobile service usage for the terahertz system. According to the outdoor scenario criteria, available bandwidth may be classified based on oxygen attenuation $10^2$ dB/km in the spectrum of up to 1 THz. Accordingly, a framework in which the available bandwidth is composed of several band chunks may be considered. As an example of the framework, if the length of the terahertz pulse (THz pulse) for one carrier (carrier) is set to 50 ps, the bandwidth (BW) is about 20 GHz.

Effective down conversion from the infrared band to the terahertz band depends on how to utilize the nonlinearity of the O/E converter. That is, for down-conversion into a desired terahertz band (THz band), design of the photoelectric converter (O/E converter) having the most ideal nonlinearity to move to the corresponding terahertz band (THz band) is required. If a photoelectric converter (O/E converter) which is not suitable for a target frequency band is used, there is a high possibility that an error occurs with respect to the amplitude and phase of the corresponding pulse.

In a single carrier system, a terahertz transmission/reception system may be implemented using one photoelectric converter. In a multi-carrier system, as many photoelectric converters as the number of carriers may be required, which may vary depending on the channel environment. Particularly, in the case of a multi-carrier system using multiple broadbands according to the plan related to the above-described spectrum usage, the phenomenon will be prominent. In this regard, a frame structure for the multi-carrier system can be considered. The down-frequency-converted signal based on the photoelectric converter may be transmitted in a specific resource region (e.g., a specific frame). The frequency domain of the specific resource region may include a plurality of chunks. Each chunk may be composed of at least one component carrier (CC).

The aforementioned contents may be combined with subsequent embodiments proposed in the present disclosure and applied or may be supplemented to clarify technical characteristics of the embodiments proposed in the present disclosure. Hereinafter, the embodiments to be described hereinafter have been divided for convenience of description only, and some elements of any one embodiment may be substituted with some elements of another embodiment or may be mutually combined and applied.

In mobile communication, beamforming is used to increase a reach distance of the signal and to send a strong signal in a desired direction. To implement beamforming, a phase shifter must be connected to each antenna of the array antenna. However, as the mobile communication frequency increases, the size of the antenna decreases while the size of the phase shifter connected to the antenna does not decrease, causing a problem. In the present disclosure, a scheme of beamforming by adjusting a radiation pattern of the antenna without using the phase shifter is proposed.

First, the prior art related to beamforming and problems related to beamforming in the terahertz band will be described.

As the transmission data capacity required for mobile communication increases, the frequency of mobile communication is gradually increasing. Accordingly, the size of the antenna is reduced and the range of the signal is shortened. In addition, as the frequency increases, there is a problem in that signal output decreases due to device limitations. In order to solve this problem, beamforming technology for sending a strong signal in a specific direction using a plurality of antennas is being researched. Beamforming is a technique for sending a strong signal in a specific direction by adjusting the phases of signals entering a plurality of antennas configured in an array so that the signal becomes reinforcement interference in a specific direction. To implement the beamforming, the phase shifter must be connected to each antenna of the array antenna.

The THz band is being discussed as a frequency for 6G mobile communication. The THz band means a frequency of 100 GHz to 10 THz. In the THz band, the wavelength is very short, so the path loss of the channel is very large. In addition, since the signal output is very small, beamforming using the array antenna is essential to support the signal reach distance required in mobile communication. However, in the THz band, it is difficult to constitute the antenna by the array antenna because the size of the phase shifter is large compared to the size of the antenna.

In addition, in the THz band, a very large beam gain must be obtained by constituting a very small antenna in a massive array. At this time, if the phase shifter is connected to each of a large number of antennas, power consumption will be very large, a heat generation problem will occur, and power loss will occur due to insertion loss of the phase shifter. Therefore, in the THz band, it is difficult to constitute the beamforming system using the phase shifter.

Therefore, a beamforming scheme not using the phase shifter is required.

Conventionally, there is a technology for strongly sending a signal in a specific direction without using the phase shifter. A pattern reconfigurable antenna is an antenna of which radiation pattern may be adjusted in various ways. There are several methods of obtaining pattern reconfigurability, and representatively, there is a method of selecting a parasitic element through a switch, and a method of controlling the radiation pattern by connecting a reactively loaded element to a parasitic element called Electronically Steerable Parasitic Array Radiator (ESPAR).

However, both the method using the parasitic element switching and the ESPAR scheme require a plurality of parasitic antennas to be disposed around the main antenna. Accordingly, in the case of two methods, since the volume of the unit antenna increases, it is impossible to expand the array. Further, in the case of the existing pattern reconfigurable antennas, there is a limitation that the number of radiation directions that can be changed according to the number of parasitic elements is limited.

In the present disclosure, a solution is proposed by utilizing the phase of the antenna radiation pattern.

The radiation pattern of an antenna can be explained as follows. The electric field radiated from the antenna travels at all angles. Here, the angle means an elevation angle $\theta$ and an azimuth angle $\phi$.

In the case of the angles $\theta$ and $\phi$ of the E-field, $\theta$ has a range of 0° to 180° and $\phi$ has a range of −180° to 180°. There is an E-field radiated from the antenna for each corresponding angle ($\theta$, $\phi$). The E-field has vertical polarization and horizontal polarization elements. Therefore, there are $E_v(\theta, \phi)$ and $E_h(\theta, \phi)$ for each of all angles $(\theta, \phi)$.

The E-field radiated from the antenna has a different phase for each angle and for each vertical polarization and horizontal polarization. Radiation patterns of all angles $(\theta, \phi)$ include relative phase information $\Theta(\theta, \phi)$ and $\Phi(\theta, \phi)$. Therefore, the radiation pattern of the antenna can be expressed by Equation 1 as follows.

$$E(\theta, \phi) = E_v(\theta, \phi) \cdot e^{j\Theta(\theta,\phi)} + E_h(\theta, \phi) \cdot e^{j\Phi(\theta,\phi)} \qquad \text{[Equation 1]}$$

The E-field radiated from the antenna varies with angle. Expressing the size of the E-field radiated from the antenna at each angle $(\theta, \phi)$ as a radius r is the radiation pattern. The radiation pattern of an antenna is generally expressed in the form of a polar plot with angle and radius as axes. Hereinafter, matters related to the radiation pattern of the antenna will be described in detail with reference to FIG. 17.

FIG. 17 illustrates a radiating pattern of an antenna.

Specifically, (a) of FIG. 17 is a 2D radiation pattern of the antenna, and (b) of FIG. 17 is a 3D radiation pattern of the antenna. Referring to (a) of FIG. 17 and (b) of FIG. 17, information on the radiation direction, peak gain, and 3 dB beam width of the antenna may be obtained through the radiation pattern of the antenna. Further, from the radiation pattern of the antenna, vertical polarization and horizontal polarization phase information $\Theta(\theta, \phi)$ and $\Phi(\theta, \phi)$ for all directions $(\theta, \phi)$ may be obtained.

Hereinafter, differences between the embodiments described later in the present disclosure and the prior art will be briefly summarized and described.

In the present disclosure, an antenna structure capable of generating various radiation patterns by changing the location of the feeding point and a value of reactance connected to the feeding point is proposed. The radiation direction of the antenna and the phase of the radiation pattern may be adjusted as follows. By using a switch of the antenna to select some of the plurality of feeding points of the antenna or to change the value of a variable reactance element connected to some of the selected feeding points, the radiation direction and the phase of the radiation pattern may be adjusted.

In that unlike a pattern reconfigurable antenna using a conventional parasitic element, the antenna according to the embodiment generates the radiation pattern through a combination of selected feeding points among the plurality of feeding points and adjustment of the reactance value, the antenna according to the embodiment is different from the pattern reconfigurable antenna. That is, compared to the case of performing the beamforming based on the phase shifter according to the conventional method, power may be saved and a heat generation problem may be prevented.

In addition, the present disclosure proposes a beamforming method using the antenna. Since a phase shifter is not used, in order to perform beamforming through selection of the feeding point and adjustment of the reactance value, an antenna pattern for utilizing the beamforming needs to be specifically defined.

Specifically, in the present disclosure, a method of generating antenna patterns having various radiation directions and phase characteristics using the switch and a variable reactance device and performing beamforming using a combination of various patterns is proposed. The peak beam gain in a target direction may be obtained by constituting an array antenna in an antenna pattern having a peak gain in the same direction as the beamforming target direction.

According to the difference from the above-mentioned prior art, the antenna according to the embodiment of the present disclosure and the beamforming method using the same have the following effects.

Unlike the conventional pattern reconfigurable antenna, the antenna according to the embodiment of the present disclosure may obtain a pattern reconfigurability in one antenna without adding a parasitic antenna or other components to a radiating element (i.e., pattern reconfiguration is possible in one antenna). Accordingly, the volume of the antenna is reduced, and array expansion is facilitated accordingly.

In addition, unlike the existing pattern reconfigurable antennas, the number of radiation patterns that may be generated is not limited, and the radiation pattern with various directions and phases may be generated through a combination of feeding points and variable reactance value adjustment.

In addition, beamforming may be performed based on an antenna capable of changing the phase and radiation direction of the radiation pattern without using the phase shifter. Specifically, unlike conventional beamforming, the phase of the antenna radiation pattern may be changed by selecting some of the plurality of feeding points for each unit antenna and adjusting the variable reactance value. Accordingly, in performing beamforming, power consumption is reduced and signal loss is also minimized. In addition, by using the antenna pattern having the peak gain in the target direction, a phenomenon in which the beam gain is reduced during beam tilting of the conventional beamforming may be improved.

Hereinafter, matters related to the antenna pattern according to an embodiment of the present disclosure will be described in detail.

The radiation pattern of the antenna depends on the structure of the antenna and the current distribution flowing through the antenna. When the current density of the antenna is J, the radiation pattern F of the antenna may be expressed as in Equation 2 below.

$$F(\hat{r}) = \frac{-jk\eta_0}{4\pi} \int_\Omega J(r)e^{jk\hat{r}r} dV \qquad \text{[Equation 2]}$$

In Equation 2 above, k represents a wave number, $$k = \frac{\omega}{c_0},$$

$\omega$ represents angular velocity, $c_0$ represents a velocity of light, $\eta_0$ represents the impedance of free space, $$\eta_0 = \sqrt{\frac{\mu_0}{\epsilon_0}},$$

$\mu_0$ represents the magnetic permeability in vacuum, $\epsilon_0$ represents the dielectric constant in vacuum, r represents a position vector in $\mathbb{R}^3$, $\hat{r}$ represents a unit direction vector, and $$\hat{r} = \frac{r}{|r|}.$$

A point at which a signal is applied to the antenna is called a feeding point. According to the location of the feeding point, the distribution of the current flowing through the antenna is changed, and thus the radiation pattern of the antenna is also changed. The radiation pattern of the antenna may be changed by selecting one or more feeding points from an antenna having a plurality of feeding points (i.e., pattern reconfigurability can be obtained).

According to an embodiment, the plurality of feeding points may include at least one type 1 feeding point and at least one type 2 feeding point. Hereinafter, matters related to the configurations of the type 1 feeding point and the type 2 feeding point will be described.

1) Configuration of Type 1 Feeding Point

The Type 1 feeding point is a feeding point where the input impedance becomes 50 ohm to operate the antenna. 50 ohm is a numerical value used as a reference point related to impedance matching in microwave engineering. An impedance having the best power transfer characteristics of electromagnetic wave energy is about 33 ohm, and an impedance having the smallest distortion of a signal waveform is about 75 ohm. The middle of these values is about 49 ohm, but 50 ohm is used for convenience of calculation. That is, signal reflection may be minimized by matching the input impedance to 50 ohm. Hereinafter, the location of the type 1 feeding point will be described with reference to FIGS. 18 and 19.

FIG. 18 is a diagram illustrating positional movement of an antenna and a feeding point according to an embodiment of the present disclosure. Referring to (a) of FIG. 18, the antenna has a circular patch shape, and referring to (b) of FIG. 18, the feeding point of the antenna moves from the edge to the center.

FIG. 19 is a graph showing input impedance and reflection coefficient according to a location of a feeding point of an antenna according to an embodiment of the present disclosure.

(a) of FIG. 19 is a graph showing the value of the input impedance when the feeding point of the antenna is moved according to (b) of FIG. 18. (b) of FIG. 19 is a graph showing the value of the reflection coefficient (S1,1) when the feeding point of the antenna is moved according to (b) of FIG. 18.

Referring to (a) of FIG. 19, the real part of the input impedance approaches 50 and the imaginary part approaches 0 toward the edge region of the antenna radiation plate. Referring to (b) of FIG. 19, it can be seen that the reflection coefficient was observed to be −10 dB or less at the edge region of the antenna radiation plate, so the antenna operates well.

As described above, the location of the feeding point that satisfies 50 Ohm matching will be described below with reference to FIG. 20.

FIG. 20 is a diagram illustrating a region where a feeding point of an antenna according to an embodiment of the present disclosure is positioned. (a) of FIG. 20 illustrates a region (Type 1/Type 2 region) where a type 1 feeding point and a type 2 feeding point of a rectangular patch antenna are positioned, and (b) of FIG. 20 illustrates a region (Type 1/Type 2 region) in which a type 1 feeding point and a type 2 feeding point are positioned of a circular patch antenna.

Referring to (a) of FIG. 20 and (b) of FIG. 20, the type 1 feeding point of a planar antenna may be positioned in a region from the edge of the planar antenna to ⅓ of the length of the planar antenna (Type 1 region). The type 2 feeding point may be located in a region other than the Type 1 region within a radiating element (Type 2 region).

In the case of (a) of FIG. 20, the Type 1 feeding point may be positioned in the Type 1 region formed based on ⅓ (W/3 and L/3) of the distance from the edge of the antenna to the opposite edge. Here, the edge may mean one surface according to the shape of the antenna, and the opposite edge may mean the other surface opposite to the one surface. Accordingly, the distance up to the opposite edge may mean a horizontal (W) or vertical (L) length according to the shape (rectangular shape) of the antenna.

In the case of (b) of FIG. 20, the Type 1 feeding point may be positioned in the Type 1 region formed based on ⅓ (r/3) of the distance from the edge of the antenna to the opposite edge. Here, the edge may mean a point according to the shape of the antenna, and the opposite edge may mean a point opposite to the center of the antenna. Accordingly, the distance to the opposite edge may mean a diameter (r) according to the shape (circle) of the antenna. Hereinafter, the configuration of the type 1 feeding point will be described with reference to FIGS. 21 and 22.

FIGS. 21 and 22 illustrate a type 1 feeding point configuration of an antenna according to an embodiment of the present disclosure. FIG. 21 illustrates the configuration of a Type 1 feeding point of a rectangular patch antenna, and FIG. 22 illustrates the configuration of a Type 1 feeding point of a circular patch antenna.

Two type 1 feeding points for each of vertical polarization (v-pol) and horizontal polarization (h-pol), i.e., a total of four type 1 feeding points 21210 and 22210 may be configured. When one of the plurality of Type1 feeding points is selected through a switch, a pattern may be generated, in which there is a difference of 180° between the vertical polarization phase $\Theta(\theta, \phi)$ and the horizontal polarization phase $\Phi(\theta, \phi)$ of the radiation pattern while the radiation direction of the antenna is fixed to broadside $((\theta, \phi)=(90°, 0°))$. Here, the switch may include all elements capable of controlling on/off of a signal, such as a PIN diode.

2) Configuration of Type 2 Feeding Point

The magnitude of the current and the magnitude of the voltage of the radiating plate of the antenna are different according to locations within the radiating plate, so the impedance value is also different. Therefore, if the feeding point is added to the radiating plate of the antenna, it has an effect similar to connecting an impedance corresponding to the corresponding location. Here, the impedance includes both a reactive component having capacitive or inductive characteristics as well as a resistive component. That is, the same effect as connecting a reactance to the antenna may be obtained through an additional feeding point regardless of 50 ohm matching.

As described above, an additional feeding point capable of changing the reactance characteristics of the antenna is defined as the Type 2 feeding point.

In the present disclosure, the type 1 feeding point and the type 2 feeding point are used to distinguish and refer to different feeding points, and are not used to limit the technical scope through the terms. For example, the type 1 feeding point may be referred to as a first feeding point, and the type 2 feeding point may be referred to as a second feeding point.

Hereinafter, an operation related to the selection of the feeding point will be described in detail with reference to FIGS. 23 and 24.

FIGS. 23 and 24 illustrate a type 1 feeding point configuration and a type 2 feeding point configuration of an antenna according to an embodiment of the present disclosure. FIG. 23 illustrates feeding point selection of a rectangular patch antenna, and FIG. 24 illustrates feeding point selection of a circular patch antenna.

By arranging one or more Type2 feeding points at various locations in the antenna having the Type1 feeding point configuration of 1), the radiation pattern of the corresponding antenna may be changed. Specifically, the radiation direction ($\theta_{peak}$, $\phi_{peak}$) of the corresponding antenna and the phases $\Theta(\theta, \phi)$ and $\Phi(\theta, \phi)$ of the radiation pattern may be changed by adding the type 2 feeding point.

Specifically, at least one of a plurality of Type1 feeding points 23210 and 24210 may be selected through the switch provided in the antenna, and at least one of a plurality of Type2 feeding points 23220 and 24220 may be selected. Through the above operation, one antenna structure may generate radiation patterns having various radiation directions ($\theta_{peak}$, $\phi_{peak}$) and phases $\Theta(\theta, \phi)$ and $\Phi(\theta, \phi)$. Hereinafter, matters related to the variable reactance element connected to the type 2 feeding point will be described with reference to FIGS. 25 and 26.

3) Addition of Variable Reactance to Type 2 Feeding Point

FIGS. 25 and 26 illustrate configurations of a feeding point and a variable reactance element of an antenna according to an embodiment of the present disclosure. FIG. 25 illustrates a variable reactance element added to the type 2 feeding point in the rectangular patch antenna, and FIG. 26 illustrates a variable reactance element added to the type 2 feeding point in the circular patch antenna.

Referring to FIGS. 25 and 26, the variable reactance element capable of changing a value between the end of the Type 2 feeding point added in 2) and the radiating element of the antenna may be inserted. The addition of the variable reactance element as described above may additionally change the radiation direction ($\theta_{peak}$, $\phi_{peak}$) of the antenna and the phases $\Theta(\theta, \phi)$ and $\Phi(\theta, \phi)$ of the radiation pattern.

Here, the variable reactance element may refer to all elements capable of equivalently changing reactance, such as a chip inductor, a chip capacitor, or a varactor diode.

Specifically, at least one of a plurality of Type1 feeding points may be selected through the switch provided in the antenna, and at least one of a plurality of Type2 feeding points 25220 and 26220 may be selected. In this case, the radiation direction ($\theta_{peak}$, $\phi_{peak}$) and the phases $\Theta(\theta, \phi)$ and $\Phi(\theta, \phi)$ of the radiation pattern may be additionally changed by adjusting the value of the variable reactance element connected to the selected type 2 feeding point.

Hereinafter, the configuration of the antenna including the variable reactance element will be described with reference to FIG. 27.

FIG. 27 illustrates a structure of an antenna including a variable reactance according to an embodiment of the present disclosure.

Referring to FIG. 27, the antenna according to an embodiment of the present disclosure may include a radiating element 27100, a plurality of feeding points 27200, a variable reactance element 27400, a feeding line 27500, and a ground plane 27600. In addition, although not illustrated in FIG. 27, the antenna may include the switch, and a corresponding configuration will be described later.

The radiating element 27100 may be implemented in various forms. FIG. 27 illustrates the radiating element 27100 implemented as a circular plate.

The plurality of feeding points 27200 may include at least one type 1 feeding point 27210 and at least one type 2 feeding point 27220. FIG. 27 illustrates an antenna in which one type 1 feeding point 27210 and two type 2 feeding points 27220 are disposed.

The variable reactance element 27400 is connected to the type 2 feeding point 27220.

The feeding line 27500 applies a signal to the radiating element 27100 and is connected to the radiating element 27100 through feeding points 27210 and 27220.

Hereinafter, in FIG. 28, the phase (horizontal polarization component) of the radiation pattern as the value of the variable reactance element is changed will be described.

FIG. 28 is a diagram for describing a phase change of an antenna pattern according to a change in variable reactance value in an antenna according to an embodiment of the present disclosure.

Specifically, (a) of FIG. 28 and (b) of FIG. 28 illustrate the (90°, 0°) direction horizontal polarization phase of the radiation pattern according to the reactance value applied to the Type2 feeding point in the same feeding point configuration.

In (a) of FIG. 28 and (b) of FIG. 28, the antenna configuration is the same as one type 1 feeding point 28210 and two type 2 feeding points 28220. However, the location where the type 1 feeding point 28210 of each antenna is disposed is different. In the antenna of (a) of FIG. 28, the type 1 feeding point 28210 is disposed on the left side, and in the antenna of (b) of FIG. 28, the type 1 feeding point 28210 is disposed on the right side.

According to the above arrangement, the antenna of (a) of FIG. 28 and the antenna of (b) of FIG. 28 have a difference of about 180 degrees in the horizontal polarization phase of the radiation pattern. That is, a case in which the values of the variable reactance elements respectively connected to the two type 2 feeding points 28220 are X1=10 and X2=10 will be described below as an example. In the case of the upper table, the horizontal polarization phase of the radiation pattern is 41.95 degrees, and in the case of the lower table, the horizontal polarization phase of the radiation pattern is 220.42 degrees.

The same reactance value or different reactance values may be applied to the variable reactance elements respectively connected to the two Type2 feeding points.

When constituting an antenna pattern database, various reactance values must be applied in order to obtain various radiation directions and various phase characteristics.

According to an embodiment, in order to obtain a significant characteristic change (that is, to effectively adjust the polarization phase of the radiation pattern for beamforming), the value of the reactance element may be adjusted to be 10 times (or 1/10 times) the previous value. By taking X1 of FIG. 28 as an example, when the value of the reactance X1 before adjustment is 100, the reactance element value may be adjusted to 1000, which is 10 times the corresponding value.

As in 1) to 3), the pattern antenna having various radiation directions and phases for each direction may include a type 1 feeding point, a type 2 feeding point, and a variable reactance element connected to the type 2 feeding point. In addition, the method of generating various radiation patterns from the antenna may be based on at least one of the following a) to c).

a) Selection of type 1 feeding point b) Selection of type 2 feeding point c) Adjusting the value of the variable reactance element connected to the type 2 feeding point Hereinafter, with reference to FIG. 29, changes in the radiation pattern according to a) to c) will be described.

FIG. 29 is a diagram illustrating a change of a beam according to selection of a feeding point in an antenna according to an embodiment of the present disclosure.

(a) of FIG. 29 to (c) of FIG. 29 correspond to the above-described a) to c), respectively. Specifically, in (a) of FIG. 29, one type 1 feeding point 29210 is selected, in (b) of FIG. 29, two type 2 feeding points 29220 are additionally selected, and in (c) of FIG. 29, reactance values Xc1 and Xc2 are applied to each of the variable reactance elements connected to the type 2 feeding points 29220, respectively.

(a) of FIG. 29 to (c) of FIG. 29 illustrate the radiation pattern, the radiation direction, and the polarization phase change in the broadside direction according to the selection of the feeding point and the reactance value.

As described above, by selecting at least one feeding point among a plurality of feeding points, the antenna may generate various radiation patterns. In this regard, the configuration of the plurality of feeding points included in the antenna will be described with reference to FIG. 30.

FIG. 30 illustrates various feeding point configurations in an antenna according to an embodiment of the disclosure.

Referring to FIG. 30, the configuration of the feeding point of the antenna capable of changing the phase and radiation direction of the radiation pattern may be either a symmetrical structure or an asymmetrical structure. For example, the type 1 feeding point 30210 may be disposed in at least one of upper, lower, left, and right locations, and one or more type 2 feeding points 30220 may be disposed in a region inside the type 1 feeding point.

Hereinafter, the structure of the antenna including a switch will be described with reference to FIG. 31.

FIG. 31 illustrates an antenna according an embodiment of the present disclosure.

Referring to FIG. 31, the antenna according to an embodiment of the present disclosure may include a radiating element 31100, a plurality of feeding points 31200, a switch 31300, a variable reactance element 31400, a feeding line 31500, and a ground plane 31600.

A feeding line for applying a signal to the radiating element 31100 is connected to the plurality of feeding points 31200.

The switch 31300 turns on or off the signal applied to each feeding point among the plurality of feeding points 31200.

The variable reactance element 31400 is connected to at least one feeding point among the plurality of feeding points 31200.

The plurality of feeding points 31200 may include at least one first feeding point 31210 disposed at a first location and at least one second feeding point 31220 disposed at a second location different from the first location.

The second feeding point 31220 may be connected to the variable reactance element 31400.

According to an embodiment, the first location is positioned within a region formed based on a specific length from the edge of the radiating element. The second location may be positioned outside the region.

The specific length may be based on ⅓ (one third) of the length from the edge up to the opposite edge.

According to an embodiment, the variable reactance element may be based on the chip inductor, the chip capacitor, or the varactor diode. The switch 31300 may be based on a PIN diode.

In terms of implementation, the antenna according to the above-described embodiment may be implemented by being included in devices of FIGS. 41 to 45 to be described later. By taking FIG. 42 as an example, the antenna 108/208 may include a radiating element 31100, a plurality of feeding points 31200, a switch 31300, a variable reactance element 31400, a feeding line 31500, and a ground plane 31600.

Hereinafter, a beamforming method based on the afore-mentioned antenna will be described in detail.

[1] Configuration of Antenna Pattern Database

Peak gain direction and phase information of an antenna radiation pattern that may be generated according to the above-described antenna structure may be stored as the antenna pattern. The antenna pattern may be stored in the memory 104/204 or the memory unit 130 of FIG. 42, 44, or 45 to be described later. The antenna pattern database may mean a plurality of antenna patterns based on the structure of the antenna.

The phase information denotes a polarization phase for angular ranges $\theta \in \{\theta_{min}, \theta_{max}\}$ and $\phi \in \{\phi_{min}, \phi_{max}\}$ corresponding to a targeted scan range during beam operation. Specifically, the phase information may include a vertical polarization (v-pol) phase $\Theta(\theta, \phi)$ and a horizontal polarization (h-pol) phase $\Phi(\theta, \phi)$ for the angular range.

The antenna pattern database may include the following information. At this time, it is assumed that the antenna includes K feeding points, and L feeding points among them are the type 2 feeding points. That is, it is assumed that K feeding points are disposed in the antenna, and variable reactance elements are connected to the L feeding points.

The antenna pattern database may include a plurality of antenna patterns. Each antenna pattern may include at least one of the following 1) to 5).

1) Information related to selection of at least one feeding point among the plurality of feeding points. For example, the corresponding information may be expressed as a binary number X having K digits.

2) Reactance value of variable reactance element. As an example, the corresponding information may be expressed as a decimal vector Y of a length L.

3) Peak gain direction $(\theta_{peak}, \phi_{peak})$ Specifically, the peak gain direction may be based on information (e.g., X) related to the selection of the feeding point and a value (e.g., Y) of the variable reactance element.

4) 3D matrix $M_\Theta$ including vertical polarization phase information. Specifically, the 3D matrix may include vertical polarization phase information based on the information (e.g., X) related to the selection of the feeding point and the value (e.g., Y) of the variable reactance element.

5) 3D matrix $M_\Phi$ including horizontal polarization phase information. Specifically, the 3D matrix may include horizontal polarization phase information based on the information (e.g., X) related to the selection of the feeding point and the value (e.g., Y) of the variable reactance element.

Table 3 below shows an antenna pattern database based on the antenna capable of generating P radiation patterns.

TABLE 3

| Pattern number | Feeding point selection information X | Variable reactance information Y | Peak gain direction | Vertical polarization phase information | Horizontal polarization phase information |
|---|---|---|---|---|---|
| #1 | $(x_1{}^1 x_2{}^1 \ldots x_K{}^1)_2$ | $[y_1{}^1, y_2{}^1, \ldots, y_L{}^1]$ | $(\theta_{peak}{}^1, \phi_{peak}{}^1)$ | $M_\Theta{}^1[\theta, \phi, \Theta^1(\theta, \phi)]$ | $M_\Phi{}^1[\theta, \phi, \Phi^1(\theta, \phi)]$ |
| . | . | . | . | . | . |
| . | . | . | . | . | . |
| . | . | . | . | . | . |
| #P | $(x_1{}^P x_2{}^P \ldots x_K{}^P)_2$ | $[y_1{}^P, y_2{}^P, \ldots, y_L{}^P]$ | $(\theta_{peak}{}^P, \phi_{peak}{}^P)$ | $M_\Theta{}^P[\theta, \phi, \Theta^P(\theta, \phi)]$ | $M_\Phi{}^P[\theta, \phi, \Phi^P(\theta, \phi)]$ |

[2] Calculation of Ideal Phase According to Beamforming Target Direction

The beamforming target direction $\theta_{target}$, $\phi_{target}$ may be selected within the beamforming scan ranges $\theta \in \{\theta_{min}, \theta_{max}\}$ and $\phi \in \{\phi_{min}, \phi_{max}\}$. Thereafter, the phase related to the beamforming target direction may be calculated. The phase may be related to an ideal DFT beam weight.

Hereinafter, by taking an N×M array antenna as an example, the phase will be described in detail.

A phase $\varphi_{n,m}$ to be applied to an antenna at location (n, m) in the N×M array antenna is shown in Equation 3 below. In this case, N represents the number of horizontal antennas and M represents the number of vertical antennas.

$$\varphi_{n,m} = \frac{2\pi}{\lambda}(m \cdot d_h \cdot \sin(\theta_{target}) \cdot \sin(\phi_{target}) + n \cdot d_v \cdot \cos(\theta_{target})) \quad \text{[Equation 3]}$$

In Equation 3 above, $\varphi_{n,m}$ represents a phase related to the beamforming target direction $\theta_{target}$, $\phi_{target}$, n represents an n-th row in an N×M matrix, m represents an m-th column in the N×M matrix, $d_v$ represents a vertical direction interval, and $d_h$ represents a horizontal antenna interval. $\lambda$ represents a wavelength of a radio signal transmitted based on the beamforming target direction.

[3] Determination of at Least One Antenna Pattern Related to the Beamforming Target Direction At least one pattern related to the beamforming target direction among the plurality of antenna patterns may be determined. Hereinafter, the determination of at least one antenna pattern will be described by taking Table 3 described below as an example.

In respect to at least one pattern, a peak gain direction of the corresponding pattern may belong to a specific range based on the target beamforming direction $\theta_{target}$, $\phi_{target}$. Specifically, at least one pattern may be antenna pattern #p in which the peak gain direction is included in a specific range based on the target beamforming direction $\theta_{target}$, $\phi_{target}$. Among the antenna patterns #1 to #P of Table 3 above. At least one pattern may be based on the antenna patterns related to the target beamforming direction. That is, when the number of antenna patterns satisfying the above-described condition is $P_{sub}$, the antenna patterns related to the target beamforming direction may be $\{p_1, p_2, \ldots, p_{P_{sub}}\}$.

The antenna patterns may be expressed as in Equation 4 below.

$$\{p_1, p_2, \ldots, p_{P_{sub}}\} = \quad \text{[Equation 4]}$$
$$\left\{ p \middle| \begin{array}{l} \theta_{peak}^p \in \{\theta_{target} - \theta_{offset}, \theta_{target} + \theta_{offset}\} \text{ and} \\ \phi_{peak}^p \in \{\phi_{target} - \phi_{offset}, \phi_{target} + \phi_{offset}\} \end{array} \right\}$$

Polarization phase information based on the target beamforming direction $(\theta_{target}, \phi_{target})$ may be extracted from the antenna patterns #$p_1$ to #$p_{P_{sub}}$.

The polarization phase information may include at least one of i) a vertical polarization phase $\Theta^p(\theta_{target}, \phi_{target})$ based on a 3D matrix $$M_\Theta^p[\theta_{target}, \phi_{target}, \Theta^p(\theta_{target}, \phi_{target})]$$

a horizontal polarization phase $\Phi^p(\theta_{target}, \phi_{target})$ based on a 3D matrix $$M_\Phi^p[\theta_{target}, \phi_{target}, \Phi^p(\theta_{target}, \phi_{target})].$$

For example, when only the horizontal polarization phase is used for beamforming, the polarization phase information may include the horizontal polarization phase.

For example, when horizontal polarization is used for beamforming, a target direction phase based on the polarization phase information may be represented as in Table 4 below.

TABLE 4

| Pattern number | Target direction phase $\Phi(\theta_{target}, \phi_{target})$ |
|---|---|
| #$p_1$ | $\Phi^{p1}(\theta_{target}, \phi_{target})$ |
| #$p_2$ | $\Phi^{p2}(\theta_{target}, \phi_{target})$ |
| . | . |
| . | . |
| . | . |
| #$p_{P_{sub}}$ | $\Phi^{pP_{sub}}(\theta_{target}, \phi_{target})$ |

Mapping between phase and antenna patterns related to the beamforming target direction The phase $\varphi_{n,m}$ related to the beamforming target direction may be mapped with the antenna patterns. That is, the phase $\varphi_{n,m}$ related to the beamforming target direction may be mapped to the target direction phase based on the polarization phase information of the antenna patterns.

Hereinafter, the mapping operation will be described in detail based on the N×M array antenna and Table 4.

Phases $\varphi_{1,1}, \varphi_{1,2}, \ldots, \varphi_{2,1}, \varphi_{2,2}, \ldots, \varphi_{n,m}, \ldots, \varphi_{N,M}$ for forming the beam in the target beamforming direction $(\theta_{target}, \phi_{target})$ may be mapped to a most approximate value among the target direction phases $\Theta^{p1}(\theta_{target}, \phi_{target})$, $\Phi^{p2}(\theta_{target}, \phi_{target})$, . . . , $\Phi^{pP_{sub}}(\theta_{target}, \phi_{target})+2\pi$ based on the polarization phase information.

An antenna pattern to be applied to an (n,m)-th antenna may be determined based on the mapping.

The antenna pattern applied to the (n,m)-th antenna may be expressed as in Equation 5 below.

$$\#p_{(n,m)} = \arg\min_{\#p} |\Phi^p(\theta_{target}, \phi_{target}) - \varphi_{n,m}|\Phi^p(\theta_{target}, \phi_{target}) \in \quad \text{[Equation 5]}$$

$$\{\Phi^{p1}(\theta_{target}, \phi_{target}), \Phi^{p2}(\theta_{target}, \phi_{target}), \ldots,$$

$$\Phi^{pPsub}(\theta_{target}, \phi_{target}), \Phi^{p1}(\theta_{target}, \phi_{target}) + 2\pi\}$$

In Equation 5 above, $\#p_{(n,m)}$ represents an antenna pattern applied to the −th antenna among the antennas included in the N×M array antenna. That is, may be based on an antenna pattern when i) a polarization phase $\Phi^p(\theta_{target}, \phi_{target})$ determined based on the target beamforming direction $\theta_{target}, \phi_{target}$ and the 3D matrix, and ii) the phase $\varphi_{n,m}$ related to the target beamforming is minimal. In this case, all phases having a most approximate value to $\#p_1$ may be mapped to $\Phi^{p1}(\theta_{target}, \phi_{target})$ and $\Phi^{p1}(\theta_{target}, \phi_{target}) + 2\pi$. Hereinafter, mapping of the phase and the antenna pattern applied to the antenna will be described with reference to FIG. 32.

FIG. 32 is a diagram for describing mapping of antenna patterns according to an embodiment of the present disclosure.

Referring to FIG. 32, the target beamforming direction (θ, φ) is (20, 20). At this time, the phase φ related to the target beam direction may be calculated for each antenna included in a 1×4 array antenna. The phases $\varphi_{1,1}$ to $\varphi_{1,4}$ related to the target beamforming direction are 0°, 61.6°, 123.1°, and 184.7°. The phases are related respective Ant(1,1) to Ant(1, 4) included in the 1×4 array antenna.

Antenna patterns related to radiation patterns that may be generated by the 1×4 array antenna are #p1 to #p5. The antenna patterns respectively mapped to the phases $\varphi_{1,1}$ to $\varphi_{1,4}$ are antenna patterns having a minimum difference between the corresponding phases $\varphi_{1,1}$ to $\varphi_{1,4}$ and the polarization phase based on the antenna patterns #p1 to #p5. Specifically, antenna pattern #p1 is mapped to $\varphi_{1,1}$, antenna pattern #p2 is mapped to $\varphi_{1,2}$, and antenna pattern #p4 is mapped to $\varphi_{1,3}$ and $\varphi_{1,4}$.

[5] Control of Array Antenna Based on Antenna Pattern

The antenna pattern based on the mapping may be applied to the array antenna. Specifically, at least one operation of selecting the feeding point or adjusting the variable reactance may be performed for each antenna belonging to the array antenna based on the antenna pattern.

Application of the antenna pattern to each of the antennas will be described in detail below.

The antenna pattern may include information (e.g., X) related to selection of the feeding point of each antenna and a reactance value (e.g., Y).

Information X related to feeding point selection represented by the bitmap indicates on or off of a switch connected to each feeding point of the (n, m)-th antenna. A reactance value Y expressed as a decimal vector represents a reactance value to be applied to each variable reactance element connected to the feeding point of the (n, m)-th antenna.

The following operation may be performed based on the antenna pattern mapped to each antenna. On/off of a switch connected to the feeding point of each antenna and adjustment of the value of the variable reactance may be performed. A beam may be formed in the target beamforming direction ($\theta_{target}, \phi_{target}$) through the above operation.

Table 5 below illustrates the feeding point selection information X and the reactance value Y of the mapped antenna pattern.

TABLE 5

| Pattern number | Feeding point selection information X = $(x_1x_2x_3x_4x_5x_6)_2$ | Variable reactance information Y = [$y_1$, $y_2$, $y_3$, $y_4$] |
|---|---|---|
| #1 | 111000 | [50, 200, 0, 0] |
| #2 | 001001 | [0, 100, 0, 0] |
| #3 | 111010 | [10, 0, 0, 10] |
| #4 | 111010 | [10, 10, 0, 100] |
| #5 | 100001 | [0, 0, 0, 0] |

Hereinafter, referring to FIG. 33, the switch operation of the antenna based on Table 5 will be described in detail.

FIG. 33 is a diagram for describing application of an antenna pattern according to an embodiment of the present disclosure. Specifically, FIG. 34 illustrates application of antenna pattern #1 to antenna pattern #3 to four antennas Antenna 1 to Antenna 4. Referring to FIG. 34, each antenna includes six feeding points x1 to x6, and variable reactance elements are connected to four feeding points x2 to x5 among them. The switch is connected to each of the six feeding points x1 to x6.

In the case of antenna pattern #1, the feeding point selection information X is 111000. Accordingly, switches connected to feeding points corresponding to x1 to x3 among the six feeding points x1 to x6 are turned on, and switches connected to feeding points corresponding to x4 to x6 are turned off. Variable reactance element values y1 to y4 (50, 200, 0, and 0) are applied to x2 to x5, respectively. Reactance values of 50 and 200 are applied to the feeding points corresponding to x2 and x3, respectively, and a reactance value of 0 is applied to the remaining x4 and x5.

In the case of antenna pattern #3, the feeding point selection information X is 111010. Accordingly, only switches connected to feeding points corresponding to x4 to x6 among the six feeding points x1 to x6 are turned off, and switches connected to feeding points x1 to x3, and x5 are turned on. Among variable reactance element values y1 to y4 (10, 0, 0, 10), a reactance value of 10 is applied to the feeding points x2 and x5 where the switch is turned on.

A beamforming method based on the above [1] to [5] will be described with reference to FIG. 34 below.

FIG. 34 is a flowchart for describing a beamforming method according to an embodiment of the present disclosure.

Referring to FIG. 34, the beamforming method according to an embodiment of the present disclosure may be performed based on S3410 to S3450.

In S3410, an antenna pattern database based on the structure of the antenna is stored. S3410 may be based on the operation described in the above [1] (the antenna pattern database configuration).

In S3420, a phase weight related to the target beamforming direction is calculated. S3420 may be based on the operation described in the above [2] (the phase according to the beamforming target direction).

In S3430, antenna patterns having the radiation direction related to the target beamforming direction may be selected. S3430 may be based on the operation described in the above [3] (the determination of at least one antenna pattern related to the beamforming target direction).

In S3440, the phase weight related to target beamforming and the antenna patterns may be mapped. S3440 may be based on the operation described in the above [4] (the mapping between the phase and the antenna patterns related to the beamforming target direction).

In S3450, the switch connected to the feeding point of the antenna and the value of the reactance element may be controlled based on the antenna pattern database. Specifically, the switch connected to each feeding point may be on or off based on the mapped antenna pattern, and the value of the reactance element connected to the feeding point may be adjusted to a specific value. S3450 may be based on the operation described in the above [5] (the control of the array antenna based on the antenna pattern).

The beamforming method based on the above-described S3410 to S3510 may be performed by the devices of FIGS. 41 to 45 to be described later.

In terms of implementation, the operations (e.g., operations related to the SRS based on at least one of the above [1] to [5]) of the device according to the above-described embodiments may be processed by the devices (e.g., processors 102 and 202 in FIG. 42) in FIGS. 41 to 45 to be described below.

Further, the operations (e.g., operations related to the beamforming based on at least one of the above [1] to [5]) of the device according to the above-described embodiments may be stored in memories (e.g., reference numerals 104 and 204 in FIG. 42) in the form of a command/program (e.g., instruction or executable code) for driving at least one processor (e.g., reference numerals 102 and 202 in FIG. 42).

Hereinafter, differences between the beamforming system based on an embodiment of the present disclosure and the conventional beamforming system will be described with reference to FIGS. 35 to 37.

The beamforming method based on the embodiment of the present disclosure obtains a phase shift effect of the radiation pattern by utilizing the switch and the variable reactance element, and performs beamforming based thereon.

Due to the insertion loss of the phase shifter, the beamforming system based on the prior art includes a power amplifier (PA) as an active element.

On the other hand, in the case of the beamforming system using the antenna based on the embodiment, the PIN diode is used as the switch and the varactor diode is used as the variable reactance element. Since only passive elements are used in both for the switch and the variable reactance element, power consumption, complexity, and cost are reduced as compared with the beamforming system according to the prior art.

FIG. 35 illustrates a block diagram of a beamforming system using an existing phase shifter.

Figure 36:
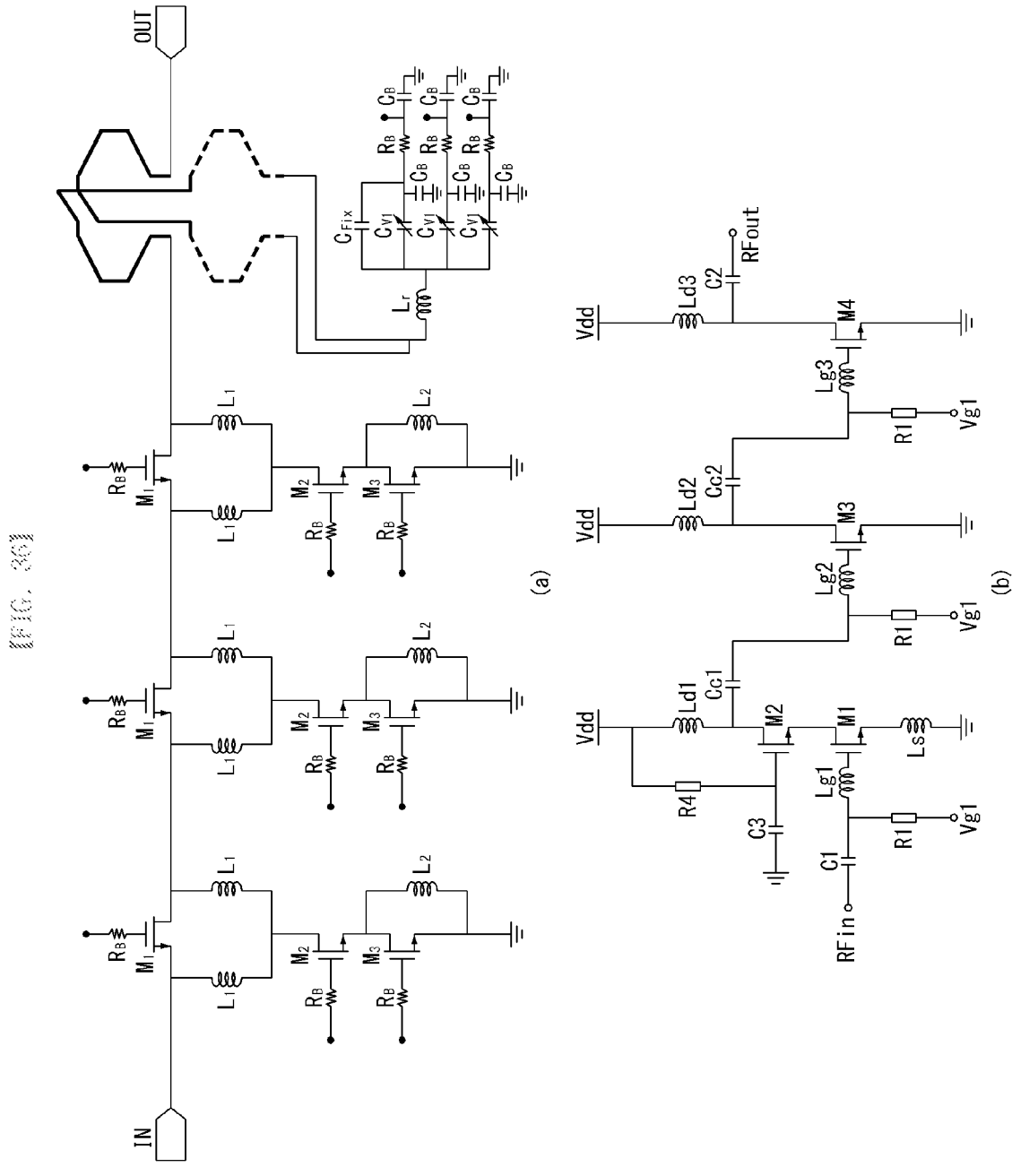
FIG. 36 illustrates a circuit diagram of a phase shifter and a power amplifier based on the prior art.

FIG. 36 illustrates a circuit diagram of a phase shifter and a power amplifier based on the prior art. Specifically, (a) of FIG. 36 illustrates a circuit diagram of a CMOS phase shifter, and (b) of FIG. 36 illustrates a circuit diagram of a power amplifier related to the phase shifter. Since a very large number of elements are required for one phase shifter, system implementation becomes very complicated when the phase shifter is used.

FIG. 37 illustrates a block diagram of a beamforming system based on an embodiment of the present disclosure. Specifically, (a) of FIG. 37 illustrates a block diagram of the beamforming system including the antenna based on an embodiment of the present disclosure. (b) of FIG. 37 illustrates a switch network included in the beamforming system.

The switch may be implemented as the PIN diode, and the variable reactor may be implemented as the varactor diode. Since all elements used in the switch network are passive elements, power consumption and complexity of the beamforming system are reduced.

Hereinafter, in FIGS. 38 and 39, a beamforming simulation result using the antenna based on the embodiment of the present disclosure will be described.

FIGS. 38a to 38c and FIGS. 39a to 39c are diagrams illustrating simulation results using a 1×16 array antenna according to an embodiment of the present disclosure.

In beamforming using the 1×16 array antenna, 4 antenna patterns are used.

FIGS. 38a to 38c illustrate a beam gain and an antenna beam pattern when a target direction is −30 degrees, −20 degrees, and −10 degrees.

FIGS. 39a to 39c illustrate the beam gain and the antenna beam pattern when the target direction is 10 degrees, 20 degrees, and 30 degrees.

Effects according to the embodiment of the present disclosure are organized as follows.

When constituting a beamforming module in a mobile communication system using a high frequency, it is not necessary to use the phase shifter, so the size of the beamforming module may be reduced, and system complexity and cost may be reduced. The beamforming module may be utilized for various array antennas. For example, the array antenna may include an antenna based on a Uniform Linear Array (ULA) or a Uniform Planar Array (UPA).

Further, the massive array antenna may be implemented without using the phase shifter. Since power loss due to insertion loss of the phase shifter is prevented, a large array antenna having characteristics of low power and low loss may be implemented. That is, a massive array antenna that may be effectively utilized in a 6G THz mobile communication system may be implemented.

Hereinafter, the above-described embodiments will be described in detail with reference to FIG. 40 in terms of the operation of the wireless device. Methods to be described below are just distinguished for convenience and it is needless to say that some components of any one method may be substituted with some components of another method or may be applied in combination with each other. The wireless device may be a wireless device (e.g., a UE/a BS) based on FIGS. 41 to 45 to be described later.

FIG. 40 is a flowchart for describing a beamforming method performed by a wireless device having an array antenna in a wireless communication system according to an embodiment of the present disclosure.

Referring to FIG. 40, a beamforming method performed by a wireless device having an array antenna in a wireless communication system according to an embodiment of the present disclosure includes a phase calculation step (S4010) related to a target beamforming direction, a step (S4020) of determining antenna patterns related to the target beamforming direction, and a step (S4030) of applying an antenna pattern based on the phase to the array antenna.

According to an embodiment, the array antenna may be based on the antenna of FIG. 31 described above. Specifically, the array antenna may include a plurality of antennas. Each antenna included in the array antenna may include multiple feeding points and a variable reactance element connected to at least one feeding point among the multiple feeding points. In terms of implementation, the array antenna may be implemented based on one or more antennas 108/208 of FIG. 42.

In S4010, the wireless device calculates a phase related to the target beamforming direction.

According to an embodiment, the phase may be calculated for each antenna included in the array antenna. The phase may be based on Equation 2 above.

According to the above-described S4010, the operation of calculating the phase related to the target beamforming direction by the wireless device (100/200 of FIGS. 41 to 45) may be implemented by the device of FIGS. 41 to 45. For example, referring to FIG. 42, one or more processors 102/202 may control one or more transceivers 106/206 and/or one or more memories 104/204 so as to calculate the phase related to the target beamforming direction.

In S4020, the wireless device determines antenna patterns related to the target beamforming direction among antenna patterns preconfigured in relation to beamforming.

According to an embodiment, the antenna pattern may be related to at least one of i) a selection of at least one feeding point among the multiple feeding points or ii) a reactance value of the variable reactance element.

The antenna pattern may include information related to at least one of the selection of at least one feeding point, the reactance value, a peak gain direction, or a polarization phase. The antenna pattern may be an antenna pattern based on the above-described [1] antenna pattern database.

According to an embodiment, the antenna patterns related to the target beamforming direction may belong to a specific range in which the peak gain direction is based on the target beamforming direction. The antenna patterns related to the target beamforming direction may be at least one antenna pattern determined based on [3] described above.

According to an embodiment, information related to the polarization phase may include a 3D matrix based on the antenna pattern. The 3D matrix may include an elevation angle, an azimuth angle, and a polarization phase based on the elevation angle and the azimuth angle.

According to an embodiment, the information related to the selection of at least one feeding point may be based on a bitmap representing on or off of each antenna. The information related to the reactance value may include a reactance value of each antenna. For example, information related to the selection of at least one feeding point may be based on feeding point selection information X, and information related to the reactance value may be based on variable reactance information Y of Table 3 above.

According to the above-described S4020, the operation of determining the antenna patterns related to the target beamforming direction among preconfigured antenna patterns related to the beamforming by the wireless device (100/200 of FIGS. 41 to 45) may be implemented by the device of FIGS. 41 to 45. For example, referring to FIG. 42, one or more processors 102/202 may control one or more transceivers 106/206 and/or one or more memories 104/204 so as to determine the antenna patterns related to the target beamforming direction.

In S4030, the wireless device applies, to the array antenna, an antenna pattern based on the phase among the antenna patterns related to the target beamforming direction.

According to an embodiment, the antenna pattern based on the phase may be based on an antenna pattern in which a difference between i) the polarization phase determined based on the target beamforming direction and the 3D matrix, and ii) the phase is the minimum. The antenna pattern based on the phase may be an antenna pattern based on Equation 5 described above.

According to an embodiment, the application of the antenna pattern based on the phase may be based on the bitmap and the reactance value of each antenna. The embodiment may be based on the operation described in the above [5] (the control of the array antenna based on the antenna pattern).

According to the above-described S4030, the operation of applying the antenna pattern based on the phase among the antenna patterns related to the beamforming to the array antenna by the wireless device (100/200 of FIGS. 41 to 45) may be implemented by the device of FIGS. 41 to 45. For example, referring to FIG. 42, one or more processors 102/202 may control one or more transceivers 106/206 and/or one or more memories 104/204 so as to applying the antenna pattern based on the phase among the antenna patterns related to the beamforming to one or more antennas 108/208.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 6G) between devices.

Hereinafter, a description will be certain in more detail with reference to the drawings. In the following drawings/description, the same reference symbols may denote the same or corresponding hardware blocks, software blocks, or functional blocks unless described otherwise.

FIG. 41 illustrates a communication system 1 applied to the present disclosure.

Referring to FIG. 41, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/ network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Devices Applied to Present Disclosure

FIG. 42 illustrates wireless devices applicable to the present disclosure.

Referring to FIG. 42, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 41.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of a Signal Process Circuit for a Transmission Signal Applied to Present Disclosure FIG. 43 illustrates a signal process circuit for a transmission signal applied to the present disclosure.

Referring to FIG. 43, a signal processing circuit 1000 may include scramblers 1010, modulators 1020, a layer mapper 1030, a precoder 1040, resource mappers 1050, and signal generators 1060. An operation/function of FIG. 43 may be performed, without being limited to, the processors 102 and 202 and/or the transceivers 106 and 206 of FIG. 42. Hardware elements of FIG. 43 may be implemented by the processors 102 and 202 and/or the transceivers 106 and 206 of FIG. 42. For example, blocks 1010 to 1060 may be implemented by the processors 102 and 202 of FIG. 42. Alternatively, the blocks 1010 to 1050 may be implemented by the processors 102 and 202 of FIG. 42 and the block 1060 may be implemented by the transceivers 106 and 206 of FIG. 42.

Codewords may be converted into radio signals via the signal processing circuit 1000 of FIG. 43. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 43. For example, the wireless devices (e.g., 100 and 200 of FIG. 42) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of a Wireless Device Applied to Present Disclosure

FIG. 44 illustrates another example of a wireless device applied to the present disclosure. The wireless device may be implemented in various forms according to a use-case/service (refer to FIG. 41).

Referring to FIG. 44, wireless devices 100 and 200 may correspond to the wireless devices 100 and 200 of FIG. 42 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 42. For example, the transceiver(s) 114 may include the one or more transceivers 106 and 206 and/or the one or more antennas 108 and 208 of FIG. 42. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 41), the vehicles (100*b*-1 and 100*b*-2 of FIG. 41), the XR device (100*c* of FIG. 41), the hand-held device (100*d* of FIG. 41), the home appliance (100*e* of FIG. 41), the IoT device (100*f* of FIG. 41), a digital broadcast terminal, a hologram device, a public safety device, an MTC device, a medicine device, a fintech device (or a finance device), a security device, a climate/environment device, the AI server/device (400 of FIG. 41), the BSs (200 of FIG. 41), a network node, etc. The wireless device may be used in a mobile or fixed place according to a use-example/service.

In FIG. 44, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of a Hand-Held Device Applied to Present Disclosure

FIG. 45 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 45, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 44, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Effects of the beamforming method and the device thereof in the wireless communication system, and the device for the same according to an embodiment of the present disclosure are described below.

According to one embodiment of the present disclosure, disclosed is an antenna including a plurality of feeding points, a switch for turning on or off the signal applied to each feeding point among the plurality of feeding points, and a variable reactance element connected to at least one of the plurality of feeding points. Therefore, based on the antenna, a beamforming system can be effectively configured without problems due to power or heat generation. That is, size, power consumption, complexity and cost are reduced in implementing the beamforming system.

According to an embodiment of the present disclosure, the plurality of feeding points includes at least one first feeding point disposed at a first location and at least one second feeding point disposed at a second location different from the first location, and the second feeding point is connected to the variable reactance element. The pattern reconfigurability of the antenna can be obtained by selecting the feeding points and adjusting a reactance value without adding a parasitic antenna or other components to the radiating element. Therefore, the antenna according to the embodiment can generate various radiating patterns and is easy to use as a module for configuring a massive array antenna.

According to an embodiment of the present disclosure, beamforming is performed by applying an antenna pattern based on a phase weight among antenna patterns related to a target beamforming direction to an array antenna. In this case, the antenna pattern is related to at least one of i) a selection of at least one feeding point among the multiple feeding points or ii) a reactance value of the variable reactance element. Therefore, beamforming can be effectively performed based on an array antenna that does not use a phase shifter. Specifically, 1) in performing beamforming, since the number of radiating patterns that can be generated is not limited unlike conventional pattern reconfigurable antennas, radiating patterns having various directions and phases can be generated. 2) Since problems of power consumption and insertion loss due to the phase shifter do not occur, beamforming can be effectively performed even in the terahertz band.

In the aforementioned embodiments, the elements and characteristics of the present disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements or the characteristics may be combined to form an embodiment of the present disclosure. The sequence of the operations described in the embodiments of the present disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present disclosure may be implemented by various means, for example, hardware, firmware, software or a combination of them. In the case of an implementation by hardware, the embodiment of the present disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

The invention claimed is:

1. A beamforming method performed by a wireless device including an array antenna in a wireless communication system, the method comprising:

calculating a phase for each antenna included in the array antenna related to a target beamforming direction;

determining, from a plurality of preconfigured antenna patterns, one or more antenna patterns related to the target beamforming direction, wherein each of the one or more determined antenna patterns has a peak gain direction within a specific range of the target beamforming direction; and applying, to each antenna in the array antenna, an antenna pattern from the one or more determined antenna patterns, wherein the antenna pattern has a radiation phase that most closely matches the calculated phase for each antenna, wherein each antenna included in the array antenna includes a plurality of feeding points including at least one first feeding point for impedance-matched signal injection and at least one second feeding point connected to a variable reactance element, and wherein applying the antenna pattern includes setting a selection of the plurality of feeding points and setting a reactance value of the variable reactance element corresponding to the antenna pattern.

2. The method of claim 1, wherein the antenna pattern includes information related to at least one of the selection of at least one feeding point, the reactance value, a peak gain direction, or a polarization phase.

3. The method of claim 2, wherein information related to the polarization phase includes a 3D matrix based on the antenna pattern, and wherein the 3D matrix includes an elevation angle, an azimuth angle, and a polarization phase based on the elevation angle and the azimuth angle.

4. The method of claim 3, wherein applying the antenna pattern based on the phase comprises selecting, from the antenna patterns related to the target beamforming direction, an antenna pattern that minimizes an absolute difference between i) the polarization phase determined from the 3D matrix for the target beamforming direction, and ii) the calculated phase related to the target beamforming direction.

5. The method of claim 2, wherein the phase is calculated for each antenna included in the array antenna, wherein the information related to the selection of at least one feeding point is based on a bitmap representing on or off of each antenna, and wherein the information related to the reactance value includes a reactance value of each antenna.

6. The method of claim 5, wherein the application of the antenna pattern based on the phase is based on the bitmap and the reactance value of each antenna.

7. A wireless device performing beamforming in a wireless communication system, the wireless device comprising:

an array antenna;

one or more transceivers transmitting and receiving radio signals through the array antenna;

one or more processors controlling the array antenna and the one or more transceivers; and one or more memories operatively connectable to the one or more processors, and storing instructions of performing operations when the beamforming is executed by the one or more processors, wherein the operations include calculating a phase for each antenna included in the array antenna related to a target beamforming direction;

determining, from a plurality of preconfigured antenna patterns, one or more antenna patterns related to the target beamforming direction, wherein each of the one or more determined antenna patterns has a peak gain direction within a specific range of the target beamforming direction; and applying, to each antenna in the array antenna, an antenna pattern from the one or more determined antenna patterns, wherein the antenna pattern has a radiation phase that most closely matches the calculated phase for each antenna, wherein each antenna included in the array antenna includes a plurality of feeding points including at least one first feeding point for impedance-matched signal injection and at least one second feeding point connected to a variable reactance element, and wherein applying the antenna pattern includes setting a selection of the plurality of feeding points and setting a reactance value of the variable reactance element corresponding to the antenna pattern.

8. The wireless device of claim 7, wherein the antenna pattern includes information related to at least one of the selection of at least one feeding point, the reactance value, a peak gain direction, or a polarization phase.

* * * * *